(12) United States Patent
Nakamura

(10) Patent No.: US 7,020,183 B2
(45) Date of Patent: Mar. 28, 2006

(54) CODE DIVISION MULTIPLE ACCESS SIGNAL RECEIVING APPARATUS

(75) Inventor: Takaharu Nakamura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 88 days.

(21) Appl. No.: 10/314,268

(22) Filed: Dec. 4, 2002

(65) Prior Publication Data

US 2003/0076877 A1    Apr. 24, 2003

Related U.S. Application Data

(63) Continuation of application No. PCT/JP00/04607, filed on Jul. 11, 2000.

(51) Int. Cl.
    *H04B 1/707* (2006.01)
(52) U.S. Cl. .................. 375/150; 375/142; 375/152; 375/343; 370/335; 370/342; 714/755
(58) Field of Classification Search ............. 375/150, 375/141, 225, 146, 142, 143, 148, 147, 149, 375/145, 130, 152, 343; 370/342, 208, 333, 370/335; 714/755; 341/107
See application file for complete search history.

(56) References Cited

U.S. PATENT DOCUMENTS

| 5,757,850 | A  | * | 5/1998 | Takaki ..................... 375/225 |
| 6,584,142 | B1 | * | 6/2003 | Chen et al. ................ 375/143 |
| 6,628,700 | B1 | * | 9/2003 | Miura ....................... 375/148 |

FOREIGN PATENT DOCUMENTS

| EP | 0 923 199  | 6/1999 |
| EP | 0 982 871  | 3/2000 |
| GB | 2 279 851  | 1/1995 |
| GB | 2 333 013  | 7/1999 |
| JP | 64-044644  | 2/1989 |
| JP | 6-209303   | 7/1994 |
| JP | 11-205286  | 7/1999 |
| JP | 2000-49689 | 2/2000 |

OTHER PUBLICATIONS

Asato, et al., "Suppression Effects of Multiple Acces Interference in Direct Sequence/Spread Spectrum Multiple Access System by Using Partial Correlation Weight Coefficient Control Techniques" Electronics and Communications in Japan, vol. 79, No. 11 Nov. 1, 1996, pp. 45-56, XP000681159, ISSN: 1042-0967.

European Search Report dated Apr. 19, 2005.

Mohammad Saquib et al. Decorrelating Detectors for a Dual Rate Synchronous DS/CDMA System. Wireless Personal Communications, Kluwer Academic Publishers, NL vol. 9, No. 3, May 1999 pp. 197-214.

* cited by examiner

*Primary Examiner*—Stephen Chin
*Assistant Examiner*—Ted M. Wang
(74) *Attorney, Agent, or Firm*—Katten Muchin Rosenman LLP

(57) ABSTRACT

In a code division multiple access signal receiving apparatus for demodulating transmit data by subjecting a receive signal to despread processing using a code sequence identical with a spreading-code sequence on a transmitting side, a cross-correlation detector calculates a cross-correlation value, on a per-symbol basis, between a spreading-code sequence for spread-spectrum modulating local-station-addressed transmit data and a spreading-code sequence for spread-spectrum modulating other-station-addressed transmit data; a discriminator discriminates whether the calculated cross-correlation value has exceeded a threshold value; and a switch halts input, to a decoder, of a portion of the receive signal that corresponds to the full interval or partial interval of a symbol where the cross-correlation value exceeds the threshold value.

12 Claims, 21 Drawing Sheets

US 7,020,183 B2

CODE DIVISION MULTIPLE ACCESS SIGNAL RECEIVING APPARATUS

This application is a continuation of international application number PCT JP00/04607, filed Jul. 11, 2000.

BACKGROUND OF THE INVENTION

This invention relates to a code division multiple access signal receiving apparatus and, more particularly, to a code division multiple access signal receiving apparatus, which is for receiving a spread-spectrum modulated signal and reproducing transmit data, in a code division multiple access communication system.

In a CDMA (Code Division Multiple Access) mobile communications system, a base station spread-spectrum modulates control information and user information of each user by employing different spreading code sequences, multiplexes the modulated information and transmits the same. Each mobile station in the system sends and receives information upon spreading and despreading the information using a spreading code sequence specified by the base station.

FIG. 16 is a block diagram of a CDMA transmitter in a base station that encodes, multiplexes and transmits the transmit data of a control channel and of a plurality of user channels. In the Figure, numerals $11_1$ to $11_n$ denote spread-spectrum modulators of respective control and user channels, each having a frame generator 21, a serial/parallel converter (S/P converter) 22 for converting frame data to parallel data, and a spreading circuit 23.

The frame generator 21 includes a transmission data generator 21a for generating serial transmit data $D_1$, a control-data generator 21b for generating control data CNDT such as a pilot, and a framing circuit 21c for forming the serial data $D_1$ into a block every prescribed number of bits and inserting the control data CNDT before and after every block to thereby form frames. The pilot signal allows a receiver to recognize the amount of phase rotation caused by transmission so that the data may be subjected to a phase rotation by an equivalent amount in the opposite direction.

The S/P converter 22 alternately distributes the frame data (the control data and transmit data) one bit at a time to convert the frame data to two sequences $D_I$, $D_Q$, namely I-component (in-phase component) data and Q-component (quadrature-component) data. The spreading circuit 23 includes a pn sequence generator 23a for generating a noise code (pn sequence) specific to the base station, a channel code generator 23b for generating a channel code specific to the control channel or user channel, an EXOR circuit 23c for outputting a spreading code $C_1$ by taking the EOR (exclusive-OR) between the noise code and the channel code, and EXOR circuits 23d, 23e for performing spread-spectrum modulation by taking the exclusive-ORs between the data $D_I$ and $D_Q$ (symbols) of the two sequences, and the spreading code $C_1$.

Reference characters $12_i$ denote a combiner for outputting an I-component code-multiplexed signal $\Sigma V_I$ by combining the I-component spread-spectrum modulated signals $V_1$ output by the spread-spectrum modulators $11_1 \sim 11_n$ of the user channels; $12q$ a combiner for outputting a Q-component code-multiplexed signal $\Sigma V_Q$ by combining the Q-component spread-spectrum modulated signals $V_Q$ output by the spread-spectrum modulators $11_1 \sim 11_n$; $13i$, $13q$ FIR-type chip shaping filters for limiting the bands of the code-multiplexed signals $\Sigma V_I$, $\Sigma V_Q$; $14i$, $14q$ DA converters for DA-converting the outputs of the filters $13i$, $13q$; 15 a quadrature modulator for applying QPSK quadrature modulation to the code-multiplexed signals $\Sigma V_I$, $\Sigma V_Q$ of the I and Q components and outputting the modulated signal; 16 a transmit circuit for converting the frequency of the output signal of the quadrature modulator to a radio frequency, amplifying the high frequency and transmitting the result; and 17 an antenna.

FIG. 17 is a block diagram of a CDMA receiver in a mobile station. A radio unit 31 converts a high-frequency signal received by the antenna 30 to baseband signals by applying a frequency conversion (RF→IF conversion). An orthogonality detector 32 detects orthogonality of the baseband signals and outputs in-phase component (I-phase component) data and quadrature component (Q-component) data. In the orthogonality detector 32, reference characters 32a denote a receive-carrier generator; 32b a phase shifter for shifting the phase of the receive carrier by $\pi/2$; and 32c, 32d multipliers for multiplying the baseband signals by the receive carrier and outputting the I-component signal and the Q-component signal. Low-pass filters (LPF) 33a, 33b limit the bands of these output signals and AD converters 35a, 35b convert the I-and Q-component signals to digital signals and input the digital signals to a despreading circuit 41.

The despreading circuit 41 subjects the input I- and Q-component signals to despread processing using a code identical with the spreading code on the transmit side and outputs a reference signal (pilot signal) and an information signal. A phase compensator (channel estimation unit) 42 averages the voltages of the I- and Q-components of the pilot signal over a prescribed number of slots and outputs channel estimation signals It, Qt. A synchronous detector 43 restores the phases of despread information signals I', Q' to the original phases based upon a phase difference θ between a pilot signal contained in a receive signal and an already existing pilot signal. More specifically, the channel estimation signals It, Qt are cosine and sine components of the phase difference θ, and therefore the synchronous detector 43 demodulates the receive information signal (I,Q) (performs synchronous detection) by applying phase rotation processing to the receive information signal (I',Q') in accordance with the following equation using the channel estimation signal (It,Qt):

$$\begin{pmatrix} I \\ Q \end{pmatrix} = \begin{pmatrix} It & Qt \\ -Qt & It \end{pmatrix} \begin{pmatrix} I' \\ Q' \end{pmatrix}$$

An error correction decoder 44 decodes the original transmit data by using the signal that enters from the synchronous detector 43 and outputs the decoded data.

In the above-described mobile wireless communication system, a base station usually cannot use a fixed directivity pattern for communication with mobile stations; it communicates using a non-directional antenna. However, not only is transmission by a non-directional antenna poor in power efficiency because radio waves are emanated also in directions in which a targeted mobile station is not present, but such transmission also degrades communication quality by subjecting mobile stations other than the targeted mobile station to interference. For this reason, practice has been to equally divide the 360° circumference of the base station so as to split the cell into a plurality of sectors (sector-shaped zones), and use a directional antenna in each sector, thereby mitigating interference.

FIG. 18 is a schematic structural view of a transceiver in a code division multiple access communication system for a case where a cell has been divided into sectors, and FIG. 19 is a flowchart of transceive processing. These illustrate an example of a case where user data signals Data1, Data2 are transmitted from a single base station BS to mobile stations MS1, MS2 in two sectors neighboring each other. Sectors Sec1, Sec2 in the base station BS have transceive antennas ANT1, ANT2 possessing separate directivities and, by virtue of the antenna directivities, take charge of the sending and receiving of signals to and from coverage areas (sectors) that are geographically independent of each other.

The user data signals Data1, Data2 undergo encoding processing, for error correction or the like, in channel coders CH-cod1, CH-cod2 in respective ones of the sectors Sec1, Sec2, and the processed signals are input to spreading circuits SC1, SC2. Encoded data Cdata1, Cdata2 is spread-spectrum modulated in the spreading circuits SC1, SC2 by mutually different spreading-code sequences PN1, PN2 generated by spreading-code generators PNG11, PNG12, whereby transmit signals Sdata1, Sdata2 are obtained. The spreading codes PN1, PN2 used in the sectors Sec1, Sec2 are produced from portions having different phases in an M sequence generated from the same generating polynomial. As a result, the spreading codes produced are such that their mutual cross-correlation values take on small values on average.

In the receivers of the mobile stations MS1, MS2, on the other hand, despreading circuits RSC1, RSC2 apply despread demodulation to received signals Sdata1', Sdata2' using the same code sequences PN1' (=PN1), PN2' (=PN2), which are synchronized to the spreading-code sequences used by the base station. Channel decoders (CH-Dec1, CH-Dec2) decode receive signals Data1', Data2'.

Depending upon geographical conditions in which the mobile stations MS1, MS2 find themselves, e.g., as a result of the mobile stations being present where the antenna directivities of the two sectors Sec1, Sec2 of the base station BS overlap each other, there are cases where the signals from the two antennas ATN1, ATN2 are received by antennas ANT1', ANT2' of the mobile stations simultaneously. In such cases, receive signals other than the desired receive signals received by the mobile stations become interference noise because the two transmit signals were spread-spectrum modulated by spreading-code sequences that differ from each other. This noise remains in the receive demodulated signals. However, since this interference noise when averaged takes on a small value decided by the cross-correlation value between the spreading codes, the effects thereof are eliminated by the error correction functions, etc., of the channel decoders CH-Dec1, CH-Dec2, and data identical with the user data transmitted by the transmitting side is reproduced as receiver outputs Data1', Data2'.

Even if the cross-correlation characteristic has been selected so as to have a problem-free characteristic when averaged, there are instances where the cross-correlation characteristic deteriorates momentarily, as at the time of a high-speed data transmission that requires communication to be performed at a low spreading rate [=(symbol period)/(chip period)]. FIG. 20 is a diagram useful in describing a partial cross-correlation characteristic between pseudo-noise sequences (spreading-code sequences). This illustrates a case where the spreading rate that prevails when the two items of transmit data Data1, Data2 are spread-spectrum modulated is 4 (one symbol is spread by four chips). The cross-correlation value between the two spreading-code sequences (PN1, PN2) is expressed by how many chips of the same polarity exist at the same time per symbol (=four chip lengths). With regard to the symbol indicated by the shading in FIG. 20, three chips in one sequence have identical polarities with those of the other sequence over the duration of this one symbol. The cross-correlation value, therefore, is very large. If the cross-correlation characteristic thus is inferior locally and transmit data is spread-spectrum modulated and transmitted using this portion of the characteristic, mutual interference noise that prevails after despreading is performed on the receiving side becomes large in the above-mentioned symbol portion, as shown in FIG. 21 (see the shaded portions), and this invites local deterioration of the transmission characteristic. The major part of the local deterioration in the transmission characteristic is corrected by error-correction decoding processing in the channel decoders CH-Dec1, CH-Dec2 using signal-to-noise ratio information, and correct data is decoded as a result. In comparison with a case where there is no local deterioration, however, an increase in interference power of the entire system attendant upon an increase in average required power occurs in order to achieve a certain transmission quality. This brings about undesirable results, such as a decrease in system capacity (the number of users that can be accommodated)

Further, it is difficult to estimate the signal-to-noise ratio accurately on a per-symbol basis. It is also difficult, therefore, to execute receive processing properly by detecting an increase in local interference noise in a specific symbol contained in a receive signal.

SUMMARY OF THE INVENTION

Accordingly, an object of the present invention is to eliminate interference between signals due to momentary deterioration of a cross-correlation characteristic between spreading codes, thereby making high-quality reception possible.

In a code division multiple access signal receiving apparatus for demodulating transmit data by subjecting a receive signal to despread processing using a code sequence identical with a spreading-code sequence on a transmitting side, (1) a cross-correlation value between a spreading-code sequence for spread-spectrum modulating local-station-addressed transmit data on the transmitting side and a spreading-code sequence for spread-spectrum modulating other-station-addressed transmit data on the transmitting side is calculated symbol by symbol; (2) input of a receive-signal portion, which corresponds to all or part of a symbol in which the calculated cross-correlation value exceeds a threshold value, to a decoder is halted; and (3) the decoder executes decoding processing based upon a receive signal input thereto.

In accordance with this code division multiple access signal receiving apparatus, if a cross-correlation value between spreading-code sequences increases and gives rise to an increase in interference noise, receive processing is executed upon excluding the symbol as a non-receive symbol in the interval of increased noise. As a result, an improvement in the quality of the receive signal becomes possible.

DESCRIPTION OF THE PREFERRED EMBODIMENTS (A) First Embodiment

Figure 1:
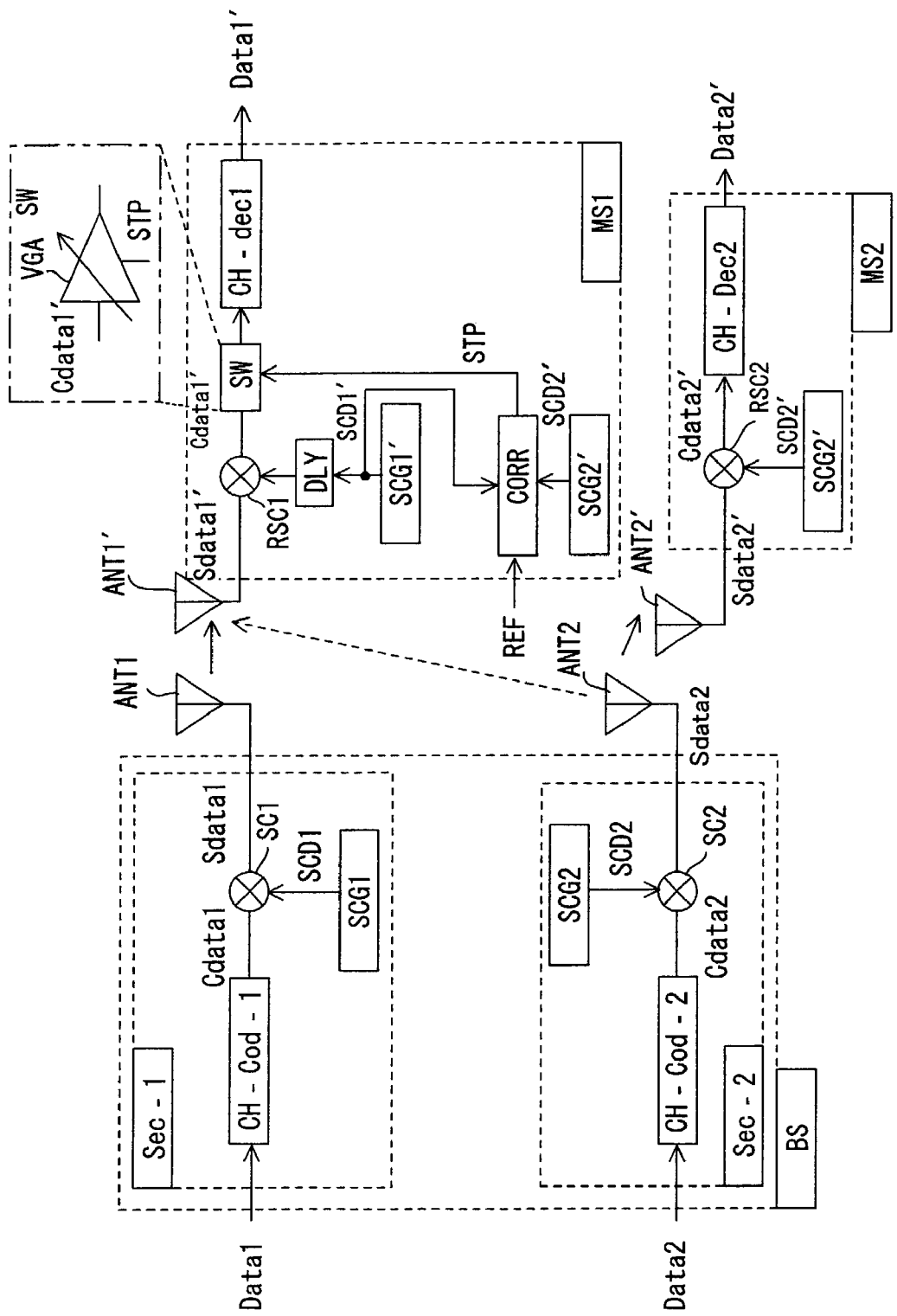
FIG. 1 shows a code division multiple access communication system according to a first embodiment.

FIG. 1 is a block diagram of a code division multiple access communication system that includes a code division multiple access signal receiver according to the present invention. This illustrates a case in which a cell has been divided into sectors. Further, the Figure illustrates an example of a case where user data signals Data1, Data2 are transmitted from a single base station (transmitting apparatus) BS to mobile stations (receiving apparatus) MS1, MS2 in two sectors neighboring each other.

Figure 16:
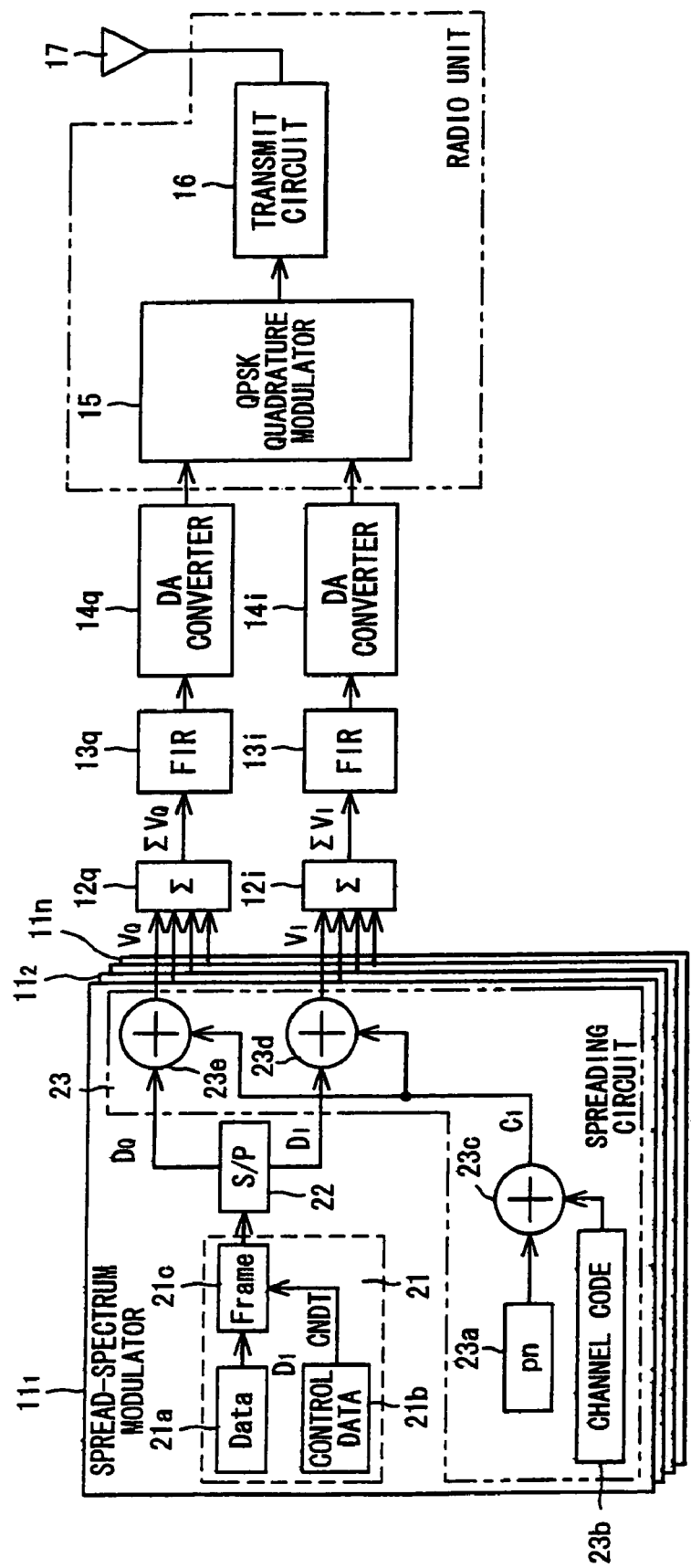
FIG. 16 shows the structure of a CDMA transmitter.
Figure 17:
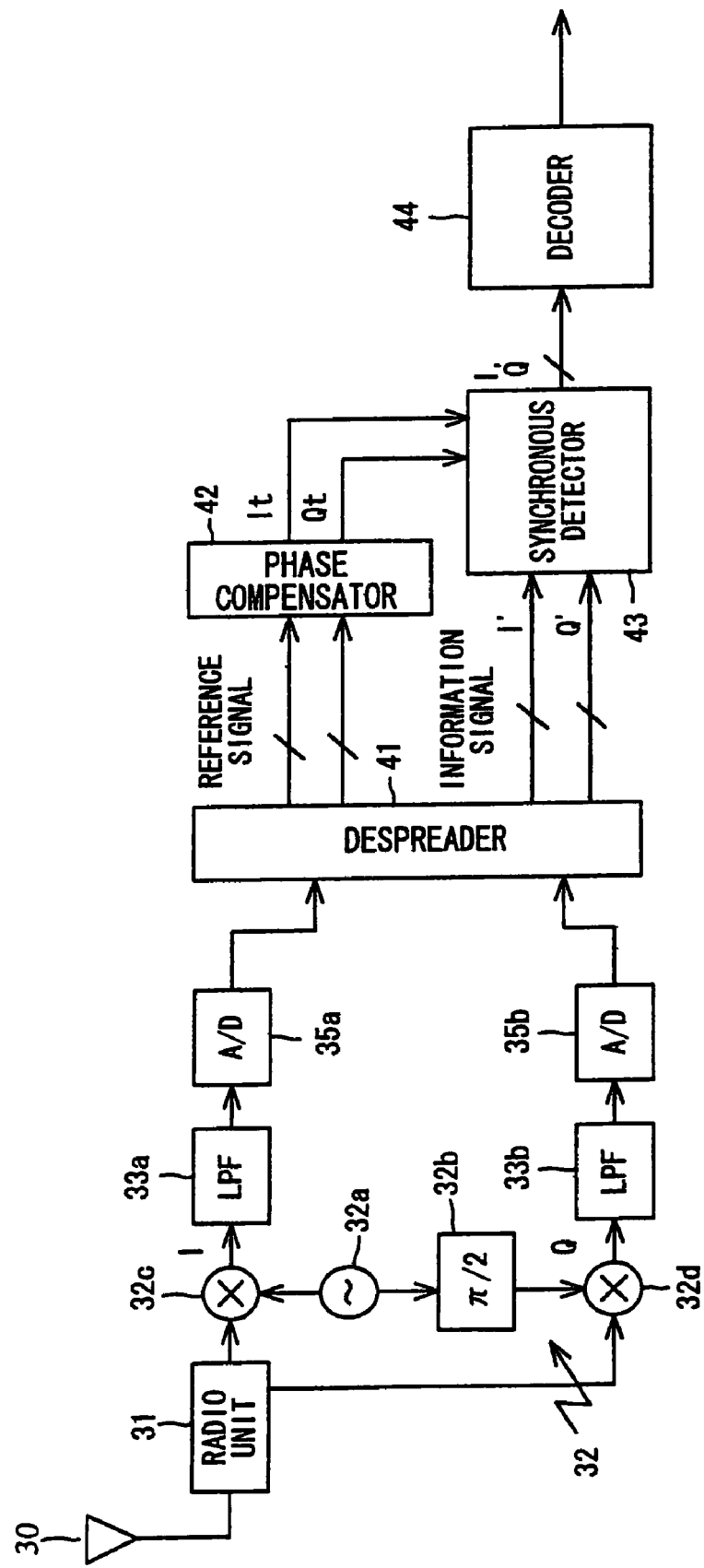
FIG. 17 is a detailed block diagram of a CDMA receiver.
Figure 18:
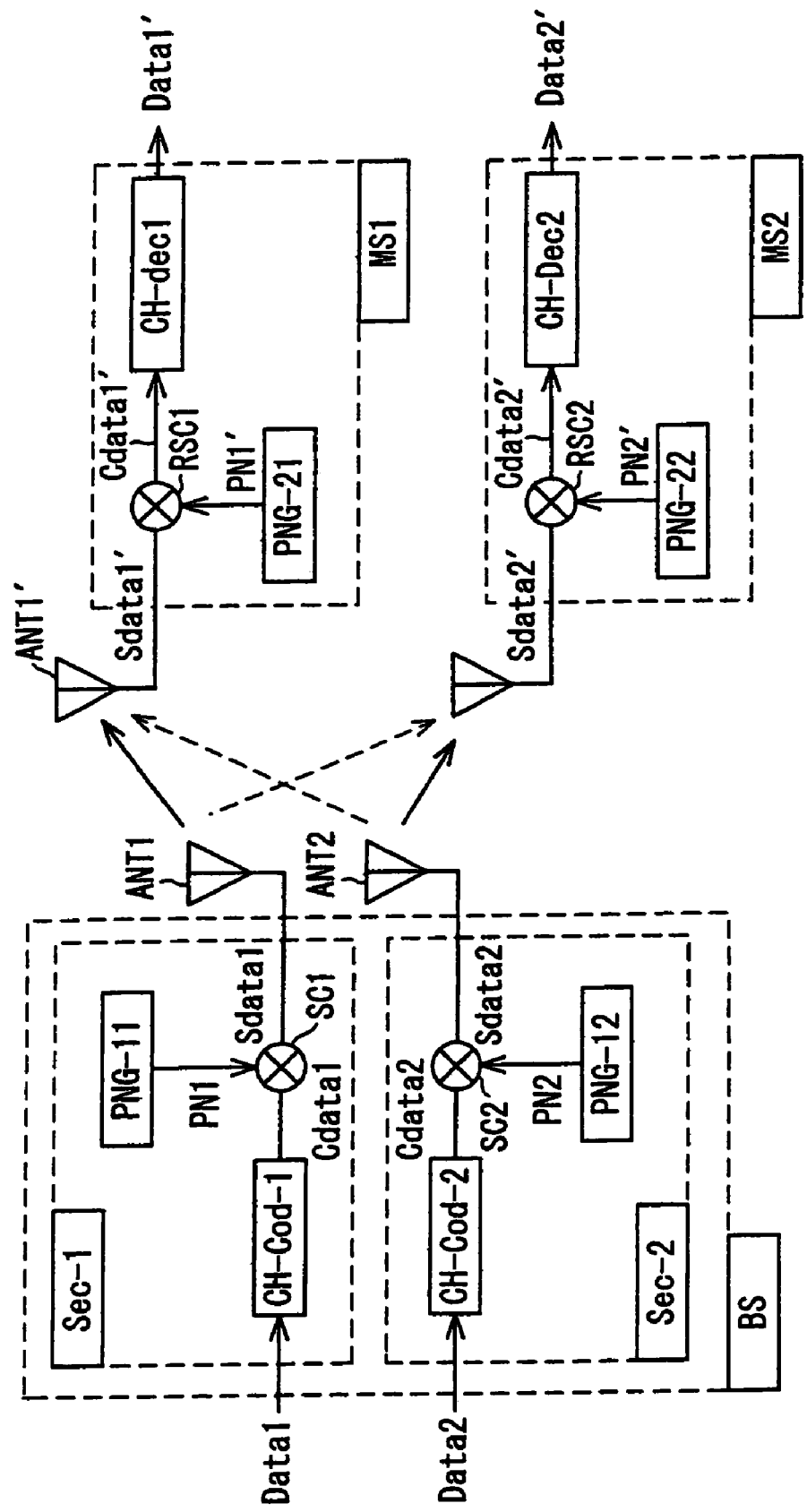
FIG. 18 is a diagram showing the configuration of a code division multiple access communication system in a case where a cell has been divided into sectors.
Figure 19:
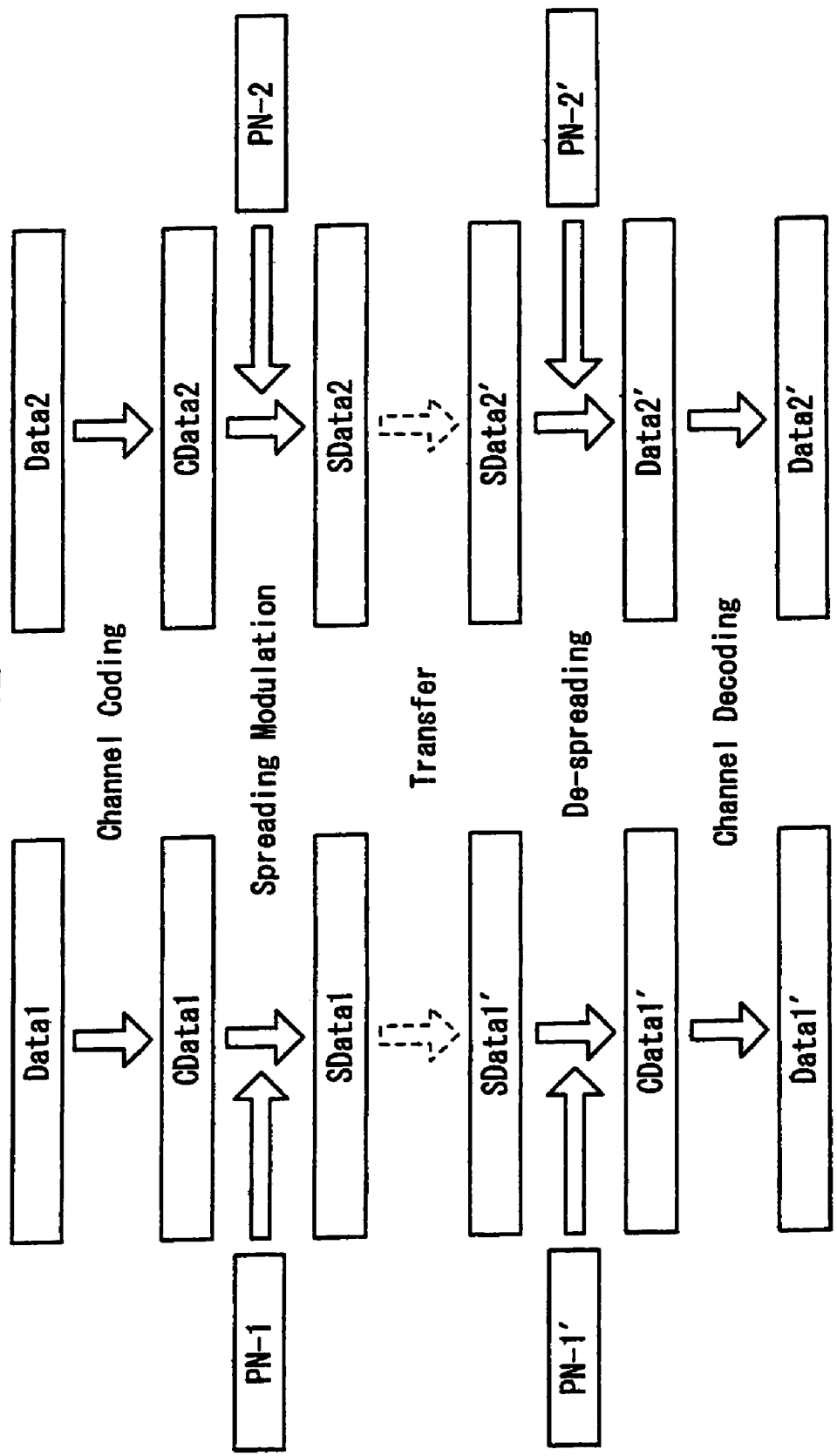
FIG. 19 is a flowchart of transceive processing according to the prior art.
Figure 20:
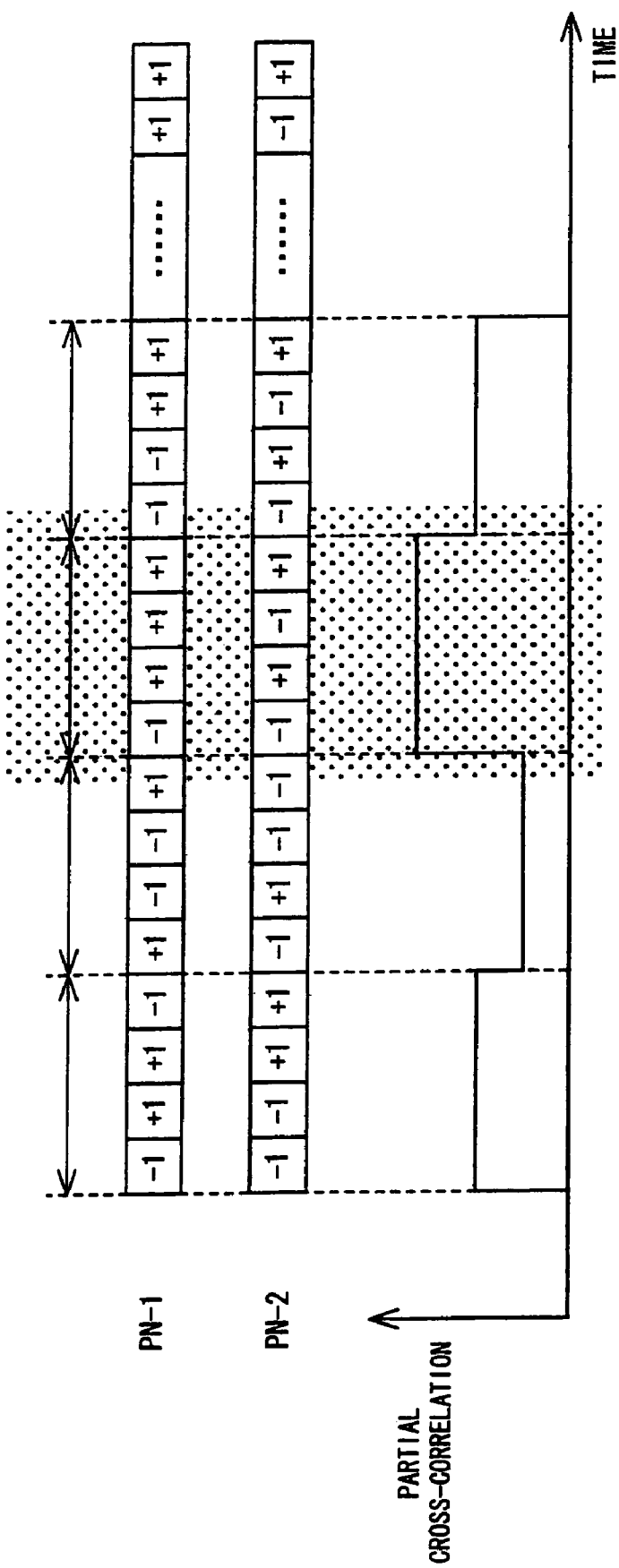
FIG. 20 shows a partial correlation characteristic between pseudonoise sequences (spreading codes)
Figure 21:
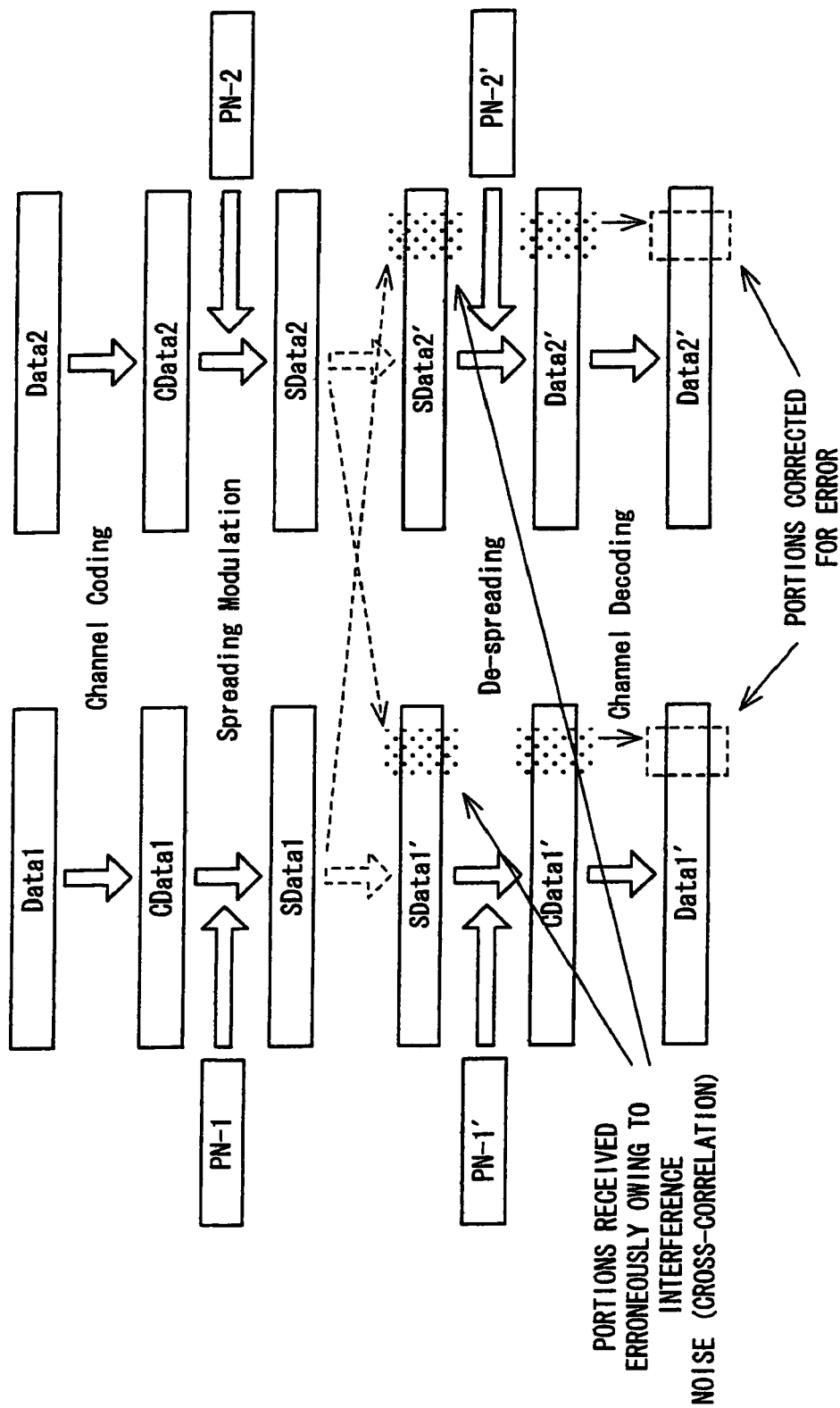
FIG. 21 is a diagram useful in describing operation of the prior art in a case where a cross-correlation characteristic undergoes partial deterioration.

Sectors Sec1, Sec2 in the base station BS have transceive antennas ANT1, ANT2 possessing separate directivities and, by virtue of the antenna directivities, take charge of the sending and receiving of signals to and from coverage areas (sectors) that are geographically independent of each other. Portions of the base station BS and mobile stations MS1, MS2 in FIG. 1 that have no bearing upon the present invention are deleted, although the deleted structure should be evident from FIGS. 16 and 17.

Channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. Spreading circuits SC1, SC2 spread-spectrum modulate the transmit signals Cdata1, Cdata2 using spreading-code sequences SCD1, SCD2 and output spread transmit signals Sdata1, Sdata2. Each of the spreading-code sequences SCD1, SCD2 is a code sequence obtained by combining (1) a scrambling base-station-specific noise-code sequence used commonly by each channel (each user) and (2) a channel-code sequence for discriminating each channel (each user). The spread-spectrum modulated transmit signals Sdata1, Sdata2 are input to transmit antennas ANT1, ANT2, respectively, via frequency converters and power amplifiers, etc., which are not shown, and the signals emanate into space from the antennas ANT1, ANT2.

On the receiving side, despreading-code sequence generators SCG1', SCG2' of the mobile stations MS1, MS2 generate despreading-code sequences SCD1', SCD2' identical with the spreading-code sequences SCD1, SCD2 used in spread-spectrum modulation on the transmitting side. A cross-correlation detector CORR in the mobile station MS1 monitors the first and second despreading-code sequences SCD1', SCD2', calculates a cross-correlation value per symbol of the two despreading-code sequences SCD1', SCD2' successively in real time, checks to determine whether the cross-correlation value has exceeded a predetermined threshold value, and outputs a control signal STP, which specifies halting of the passage of the receive signal over the duration of one symbol, when the threshold value is exceeded and interference noise is large.

A delay unit DLY delays the despreading-code sequence SCD1' for a predetermined period of time in such a manner that a despread signal Cdata1' will enter a switch SW following the completion of calculation of the cross-correlation value. A despreader RSC1 despreads a receive signal Sdata1' using the delayed despreading-code sequence SCD1' and inputs the despread signal Cdata1' to the switch SW. If the control signal STP is at the high level, the switch SW inhibits passage of the despread signal Cdata1', which enters from the despreading circuit RSC1, for the corresponding one symbol duration. By way of example, the switch SW can be constituted by a variable-gain amplifier VGA the gain whereof becomes zero when the control signal STP is at the high level. Further, it can be so arranged that an equivalent operation is performed by turning the operation of the despreading demodulator on and off.

The despread signal Cdata1' thus subjected to switching control subsequently is input to channel decoder CH-dec1. Further, despreader RSC2 of mobile station MS2 despreads receive data Sdata2' using the despreading-code sequence SCD2' and inputs a despread signal Cdata2' to channel decoder CH-dec2 without application of switching control.

The channel decoders CH-dec1, CH-dec2 of mobile stations MS1, MS2 subject the despread signals Cdata1', Cdata2' to error-correction decoding processing, generate final receive data Data1', Data2' and output this data. At this time the symbol for which passage was blocked by the switch SW is reproduced by the channel decoder CD-dec1.

In accordance with the first embodiment, if a symbol-by-symbol cross-correlation value between spreading-code sequences increases and gives rise to an increase in interference noise, receive processing is executed upon excluding the symbol in the interval of increased noise as a non-receive symbol. As a result, an improvement in the quality of the receive signal becomes possible. In other words, if the cross-correlation value on a per-symbol basis increases and interference noise is great, the fact that the quality of the symbol has declined is reported to the channel decoder in the form of signal level=0 (soft-decision likelihood information). Based upon this information, the channel decoder can judge that the reliability of the symbol is low and execute error-correction processing, as a result of which reception quality can be improved.

First Modification

In the above embodiment, control for halting passage of a receive signal is carried out only by the mobile station MS1. Depending upon a change in the reception environment, however, the mobile station MS2 also may exercise control for halting passage of a receive signal as appropriate. Further, the foregoing is described with regard to a single combination of spreading-code sequences, in which the spreading-code sequences used in respective ones of the mutually adjacent sectors are SCD1, SCD2. In actuality, however, there are multiple combinations of spreading-code sequences and the above-described control is performed with regard to the appropriate combinations. In addition, though the foregoing is for a case that takes into consideration spreading-code sequences used in mutually adjacent sectors, the above-described control can be applied to spreading-code sequences used by mutually adjacent base stations.

Second Modification

Figure 2:
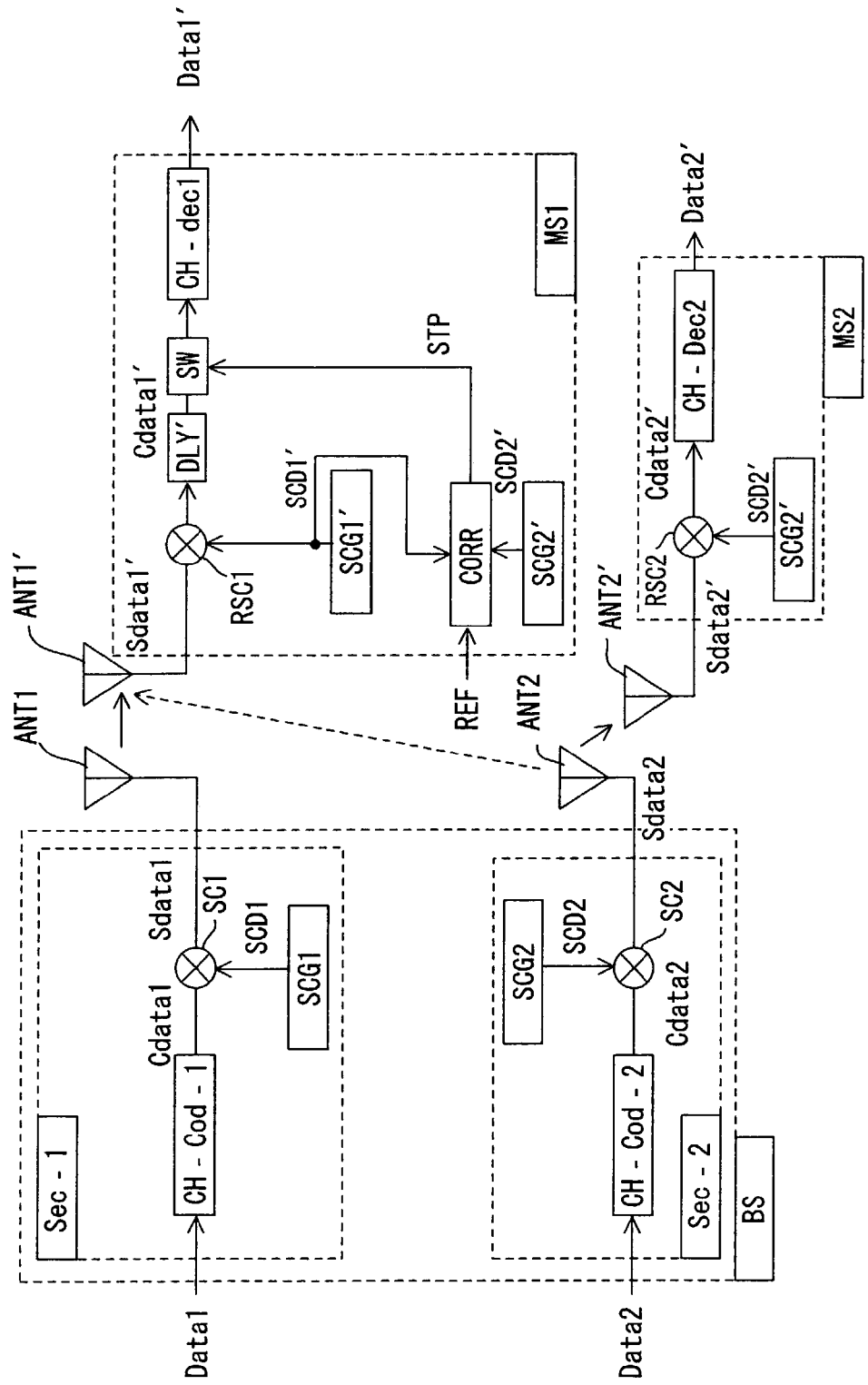
FIG. 2 shows a modification of the first embodiment.

FIG. 2 is a modification of the first embodiment, in which components identical with those of the first embodiment are designated by like reference characters. The difference is the location of the delay unit. Specifically, in the first embodiment, the despreading-code sequence SCD1' is delayed a prescribed period of time. In the modification, however, the despread signal Cdata1' output from the despreading circuit RSC1 is delayed a prescribed period of time. That is, a delay unit DLY' in this modification delays the despread signal Cdata1' for a predetermined period of time in such a manner that the despread signal Cdata1' will enter the switch SW following the completion of calculation of the cross-correlation value.

Structure of Cross-correlation Detector

Figure 3:
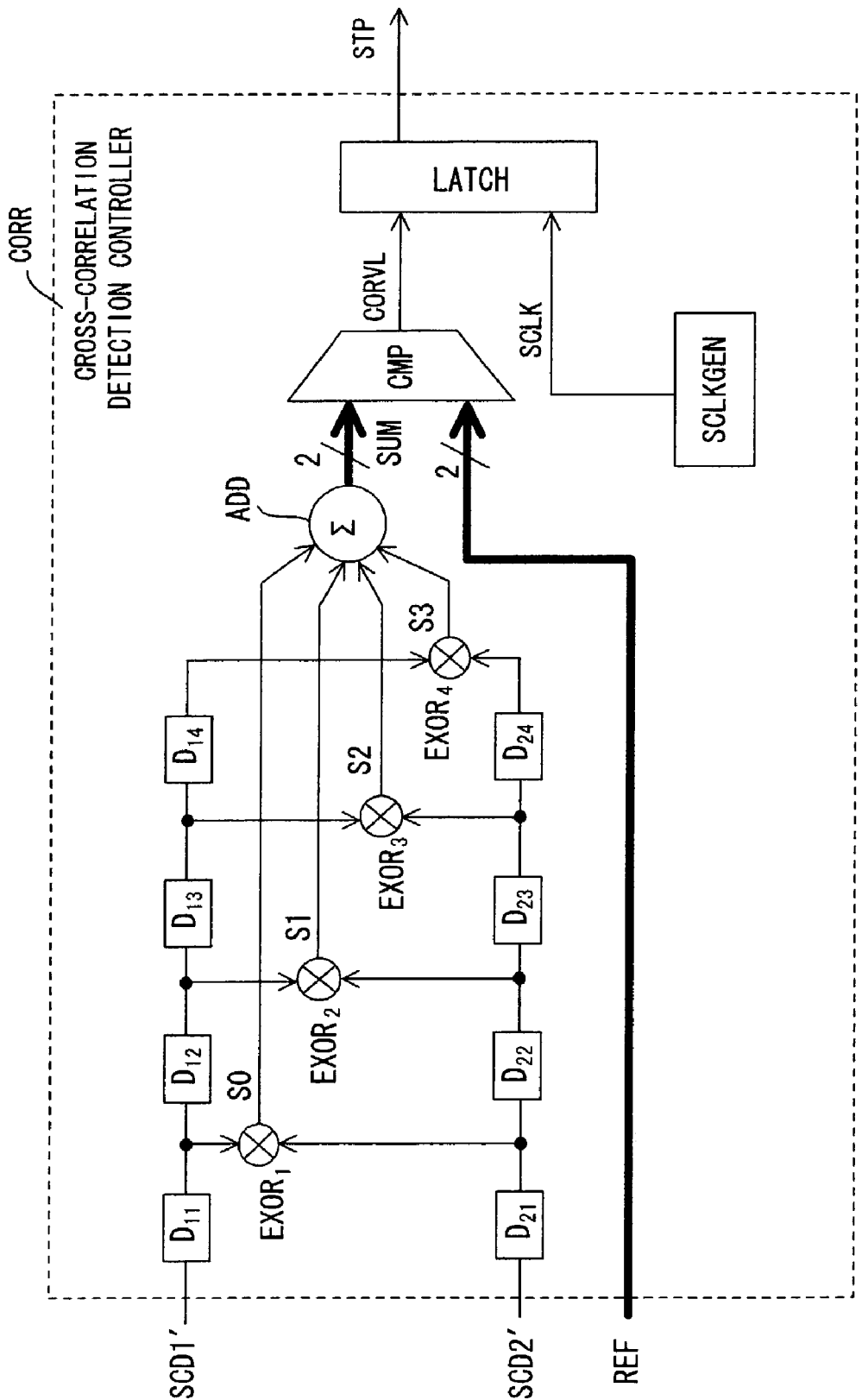
FIG. 3 is a block diagram of a cross-correlation detection controller.
Figure 4:
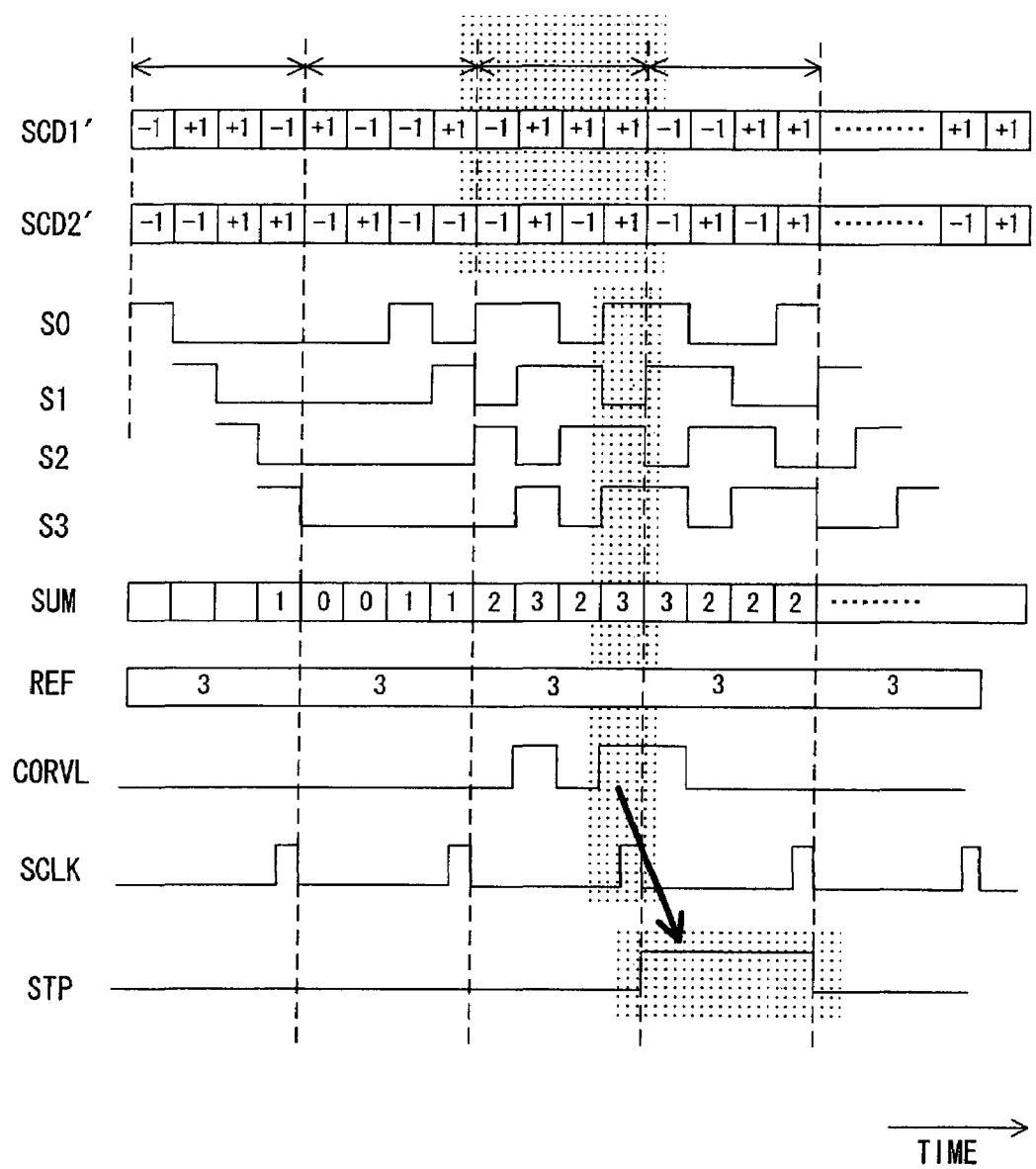
FIG. 4 is a diagram useful in describing the operation of this cross-correlation detection controller.

FIG. 3 is a block diagram of the cross-correlation detection controller, and FIG. 4 is a diagram useful in describing the operation thereof. This illustrates a case where partial correlation of despreading-code sequences is detected at such time that the spreading rate is 4. In FIGS. 3 and 4, reference characters SCD1', SCD2' represent despreading-code sequences of two systems between which cross-correlation is found; these are the outputs of the despreading-code sequence generators SCG1', SCG2' of FIG. 1. Further, reference characters STP represent the control signal for controlling stoppage/passage of the despread signal that enters the switch SW in FIG. 1.

The input despreading-code sequences SCD1', SCD2' of two systems are each delayed a total of four chips in succession by delay units $D_{11}$ to $D_{14}$, $D_{21}$ to $D_{24}$, respectively, which act as one-chip delay elements. The outputs of the delay units $D_{11}$ to $D_{14}$ of one system are input to exclusive-OR circuits $EXOR_1$ to $EXOR_4$ together with the outputs of the delay units $D_{21}$ to $D_{24}$ of the corresponding system. The exclusive-OR circuits $EXOR_1$ to $EXOR_4$ output signals S0 to S3 depending upon whether the values of the two inputs coincide or not. An adder ADD refers to the four signals S0 to S3 input thereto, counts up the signals that indicate coincidence and outputs a result SUM, which indicates the count, in the form of a 2-bit signal. A comparator CMP compares the counting result SUM and a threshold value REF at the chip cycle and outputs a high-level signal CORVL if SUM≧REF holds. A latch unit LATCH latches the signal CORVL in sync with a symbol clock SCLK, which is output every symbol (four chips), and outputs the latched signal as the control signal STP. As a result, the switch SW stops the passage of the despread signal Cdata1' over a symbol interval during which the control signal STP is at the high level, i.e., over a symbol interval during which interference noise is great. The foregoing is described in regard to a case where spreading rate=4 holds. However, if the spreading rate is larger, the arrangement adopted is such that (1) the number of delay-element stages is increased correspondingly, (2) the number of corresponding signals added by the adder ADD is increased, and (3) the number of information bits in the addition result SUN and threshold value REF is increased.

Another Structure of Cross-correlation Detector

Figure 5:
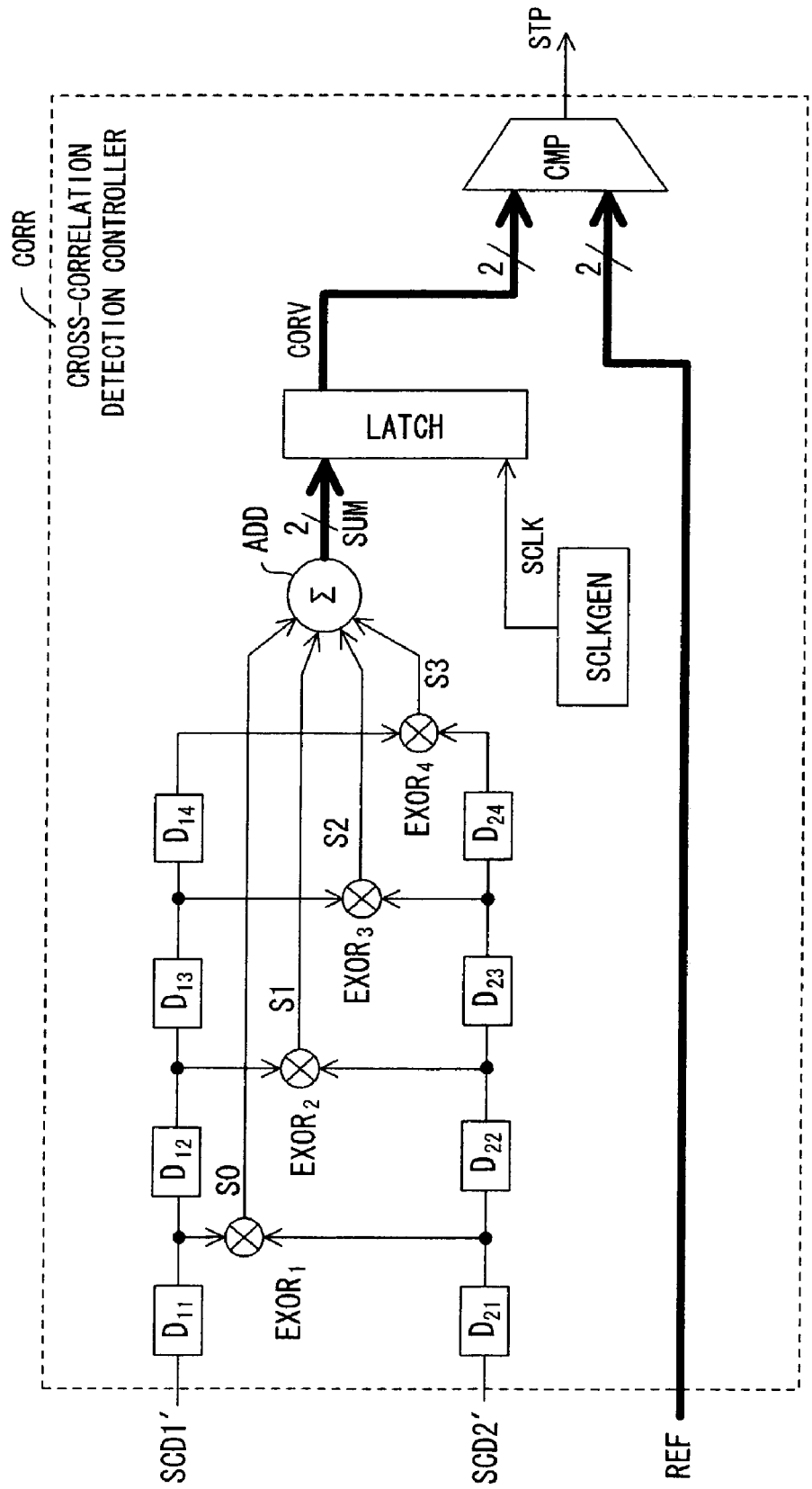
FIG. 5 is another block diagram of a cross-correlation detection controller.
Figure 6:
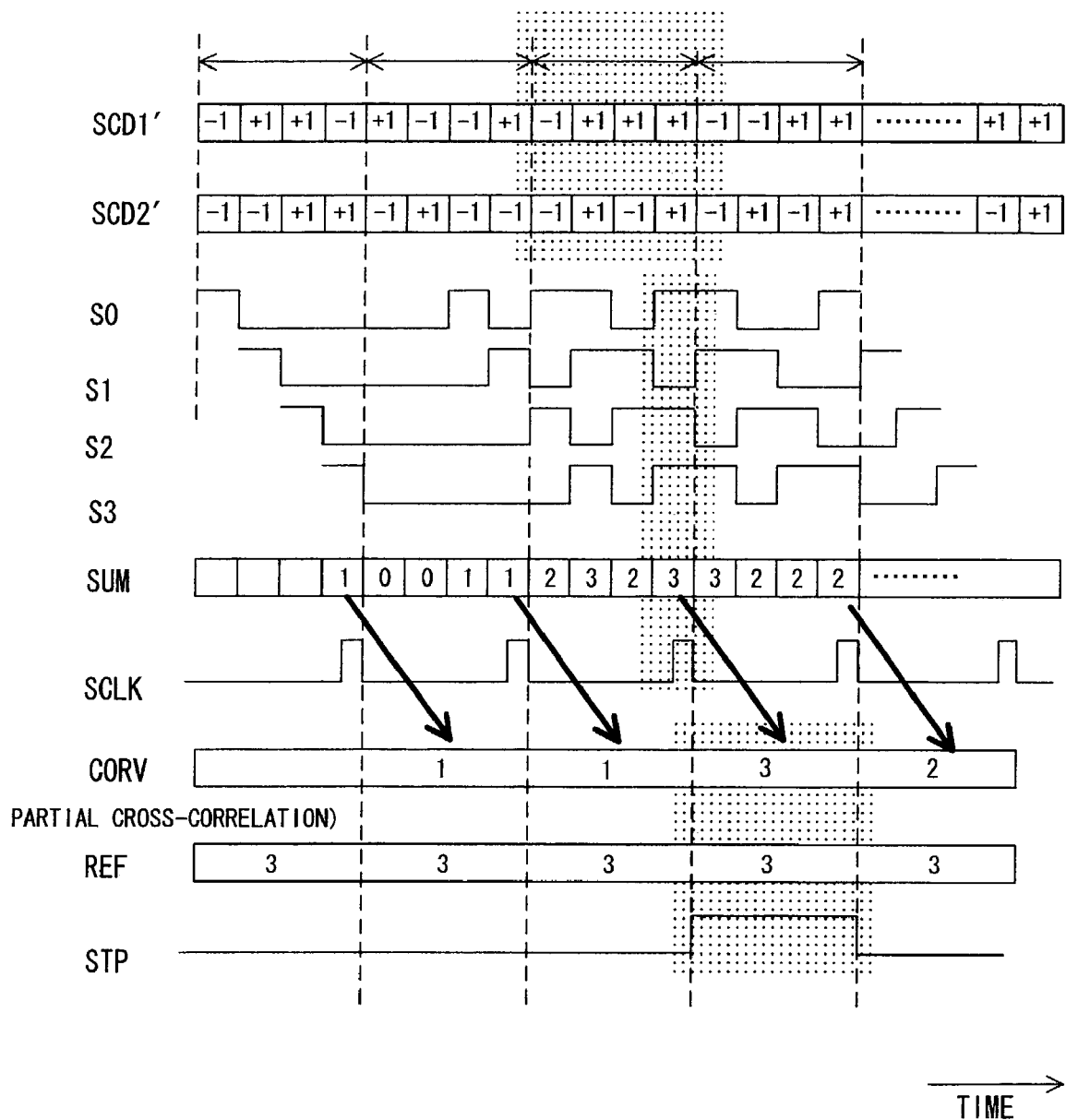
FIG. 6 is a diagram useful in describing the operation of this cross-correlation detection controller.

FIG. 5 is another block diagram of the cross-correlation detector CORR, and FIG. 6 is a diagram useful in describing the operation thereof. In FIG. 5, components identical with those of the structure shown in FIG. 3 are designated by like reference characters. The difference here is that in the cross-correlation detector CORR, the addition result SUM is latched in the latching unit LATCH by the symbol clock SCLK output from a clock generator SCLKGEN every symbol (four chips in this case), and the comparator CMP compares the latched addition result (cross-correlation value on a per-symbol basis) CORV with the threshold value REF and outputs the high-level control signal STP if the cross-correlation value CORV is equal to or greater than the threshold value REF.

In FIG. 5, the adder ADD refers to the four signals S0 to S3, counts up the signals that indicate coincidence and outputs the counted result SUM in the form of a 2-bit signal. The latching unit LATCH latches the counted result SUM in sync with the symbol clock SCLK that is output every symbol (four chips), and the comparator CMP compares the latched counted result, namely the cross-correlation value CORV, with the threshold value REF, and outputs the high-level control signal STP if CORV≧REF holds.

(B) Second Embodiment

Figure 7:
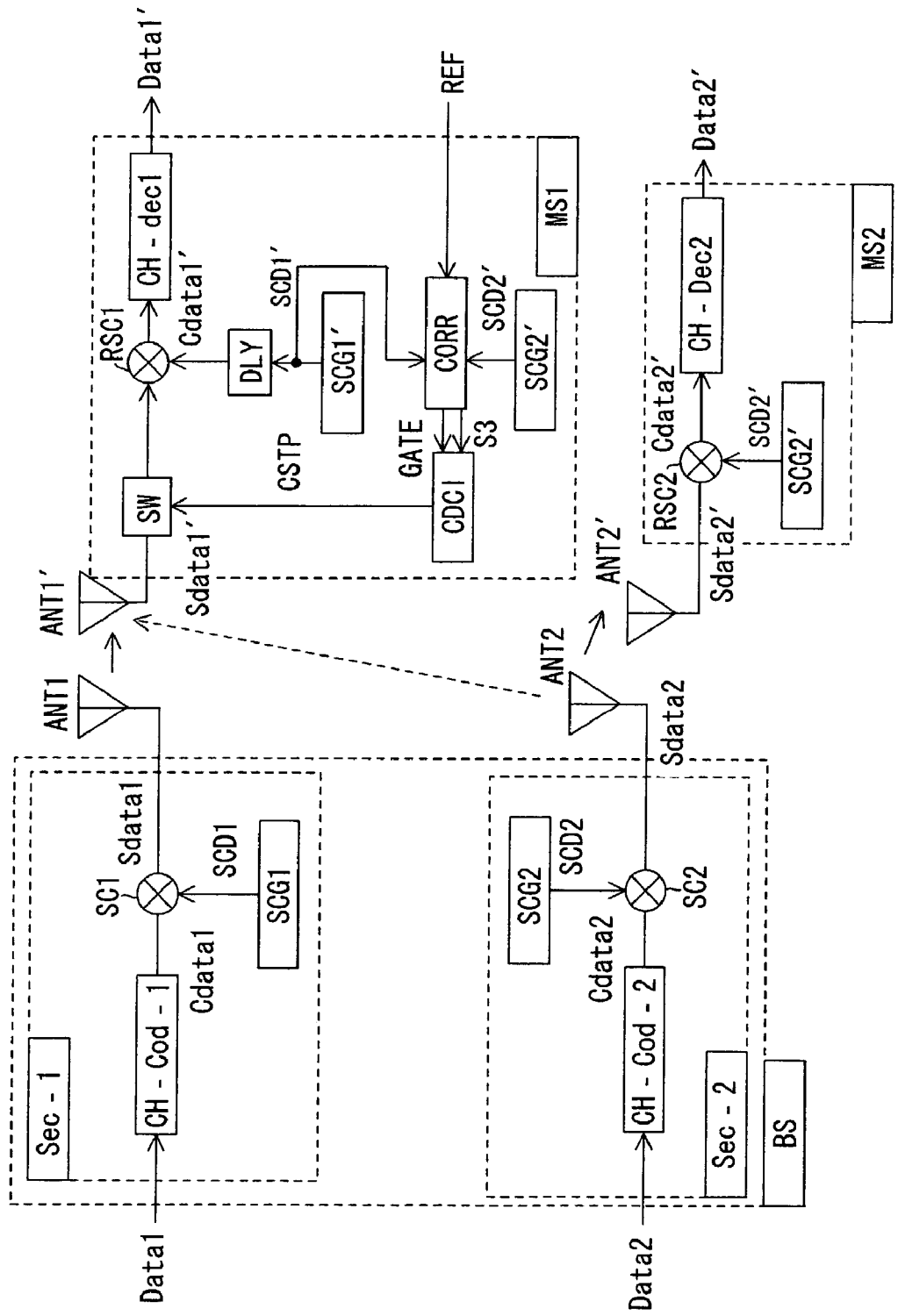
FIG. 7 shows a code division multiple access communication system according to a second embodiment.

FIG. 7 is a block diagram of a code division multiple access communication system according to a second embodiment of the present invention, in which components identical with those of the first embodiment of FIG. 1 are designated by like reference characters. This embodiment differs in the following respects:

(1) There is provided a code-coincident-chip-detector CDCI which, when the symbol-by-symbol cross-correlation value between the two spreading-code sequences SCD1', SCD2' is equal to or greater than the threshold value REF, detects chips whose codes coincide in a symbol interval and outputs a control signal CSTP that assumes a high level over the duration of each chip in which coincidence is obtained.

(2) The switch SW is moved to the input side of the despreading circuit RSC1.

(3) When the cross-correlation value on a per-symbol basis is equal to or greater than the threshold value REF, passage of the receive signal Sdata1' is inhibited in the code-coincident chip interval of the symbol interval and not over the entire symbol interval.

Channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. Spreading circuits SC1, SC2 spread-spectrum modulate the transmit signals Cdata1, Cdata2 using spreading-code sequences SCD1, SCD2 and output spread transmit signals Sdata1, Sdata2. The spread-spectrum modulated transmit signals Sdata1, Sdata2 are input to transmit antennas ANT1, ANT2, respectively, via frequency converters and power amplifiers, etc., which are not shown, and the signals emanate into space from the antennas ANT1, ANT2.

On the receiving side, despreading-code sequence generators SCG1', SCG2' of the mobile stations MS1, MS2 generate despreading-code sequences SCD1', SCD2' identical with the spreading-code sequences SCD1, SCD2 used in spread-spectrum modulation on the transmitting side. The cross-correlation detector CORR in the mobile station MS1 monitors the first and second despreading-code sequences SCD1', SCD2', calculates a cross-correlation value per symbol of the two despreading-code sequences SCD1', SCD2' successively in real time, checks to determine whether the cross-correlation value has exceeded a predetermined threshold value, and outputs a signal GATE, which is at the high level for the duration of one symbol, when the threshold value is exceeded and, hence, interference noise is large. If the cross-correlation value per symbol is equal to or greater than the threshold value, the code-coincident-chip detector CDCI, using a signal S3(described below), detects that the codes of the spreading-code sequences SCD1', SCD2' coincide in the above-mentioned symbol interval and outputs the control signal CSTP that assumes the high level over the duration of each chip in which coincidence is obtained.

The delay unit DLY delays the despreading-code sequence SCD1' for a predetermined period of time in such a manner that the despreading code SCD1' will enter the despreading circuit RSC1 following the completion of calculation of the cross-correlation value and processing for detecting code-coincident chips. The receive signal Sdata1' enters the despreading circuit RSC1 via the switch SW. If the control signal CSTP is at the high level, the switch SW inhibits passage of the despread signal Cdata1 for the corresponding one chip duration. Thereafter, the receive signal Sdata1' thus subjected to switching control chip by chip is input to the despreading circuit RSC1. The latter despreads the receive signal Sdata1' that has been subjected to switching control but plays no part in despread demodulation processing with regard to the chip portion for which signal passage has been blocked by the switch SW. The despread signal Cdata1' is input to the channel decoder CH-dec1. Further, despreader RSC2 of mobile station MS2 despreads the receive data Sdata2' using the despreading-code sequence SCD2' and inputs the despread signal Cdata2' to channel decoder CH-dec2 without application of switching control.

The channel decoders CH-dec1, CH-dec2 of mobile stations MS1, MS2 subject the despread signals Cdata1', Cdata2' to error-correction decoding processing, generate final receive data Data1', Data2' and output this data. At this time the symbol for which passage was partially blocked by the switch SW prior to despreading is reproduced by the channel decoder CH-dec1.

In accordance with the second embodiment, receive processing is executed upon excluding a chip interval of particularly large interference in a symbol interval in which interference noise is great. As a result, an improvement in the quality of the receive signal becomes possible. Further, since decoding processing can be executed using despread signals in chips for which reception conditions are good in a symbol interval, the effect of improving receive-signal quality can be enhanced.

Structure of Cross-correlation Detector and Code-coincident-chip Detector

Figure 8:
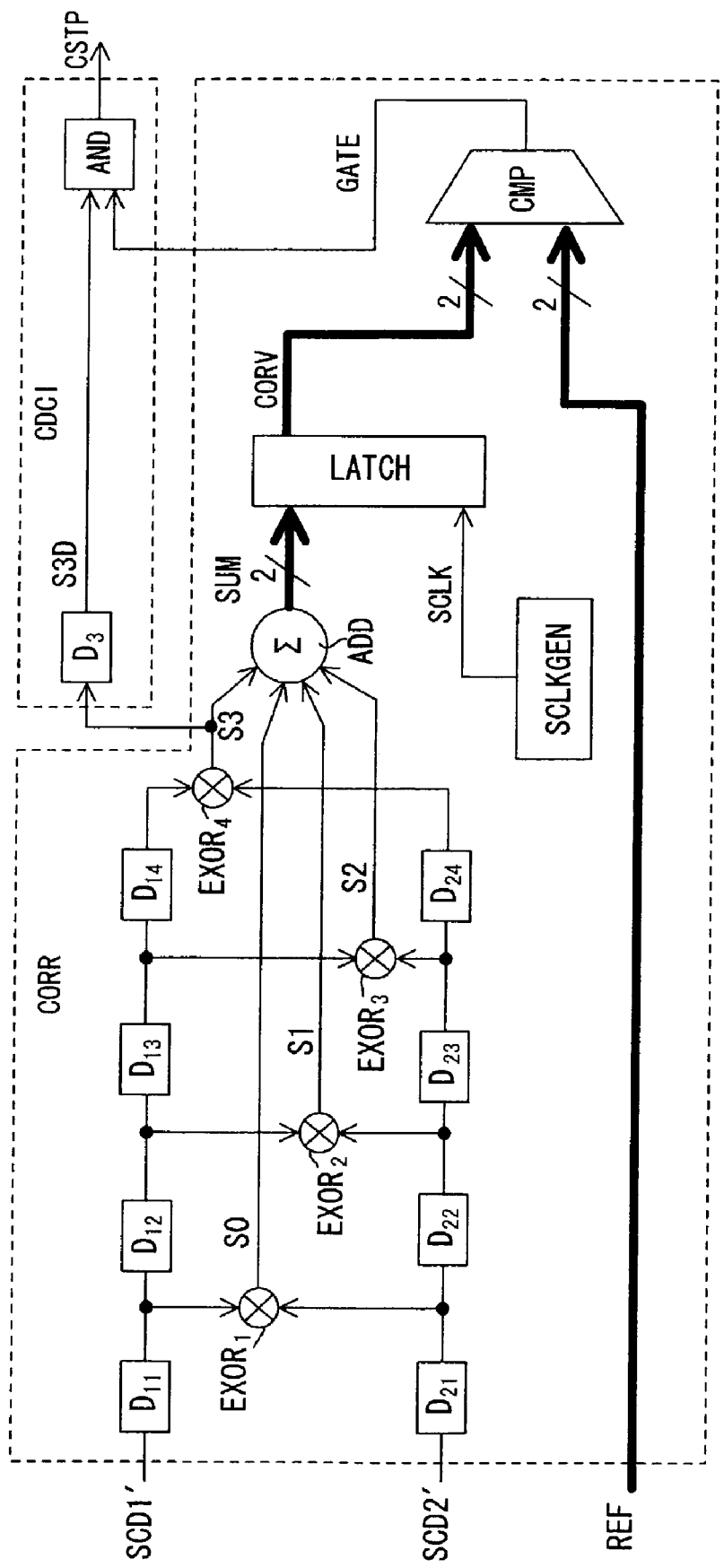
FIG. 8 is a block diagram of a cross-correlation detection controller and code-coincident-chip detector.
Figure 9:
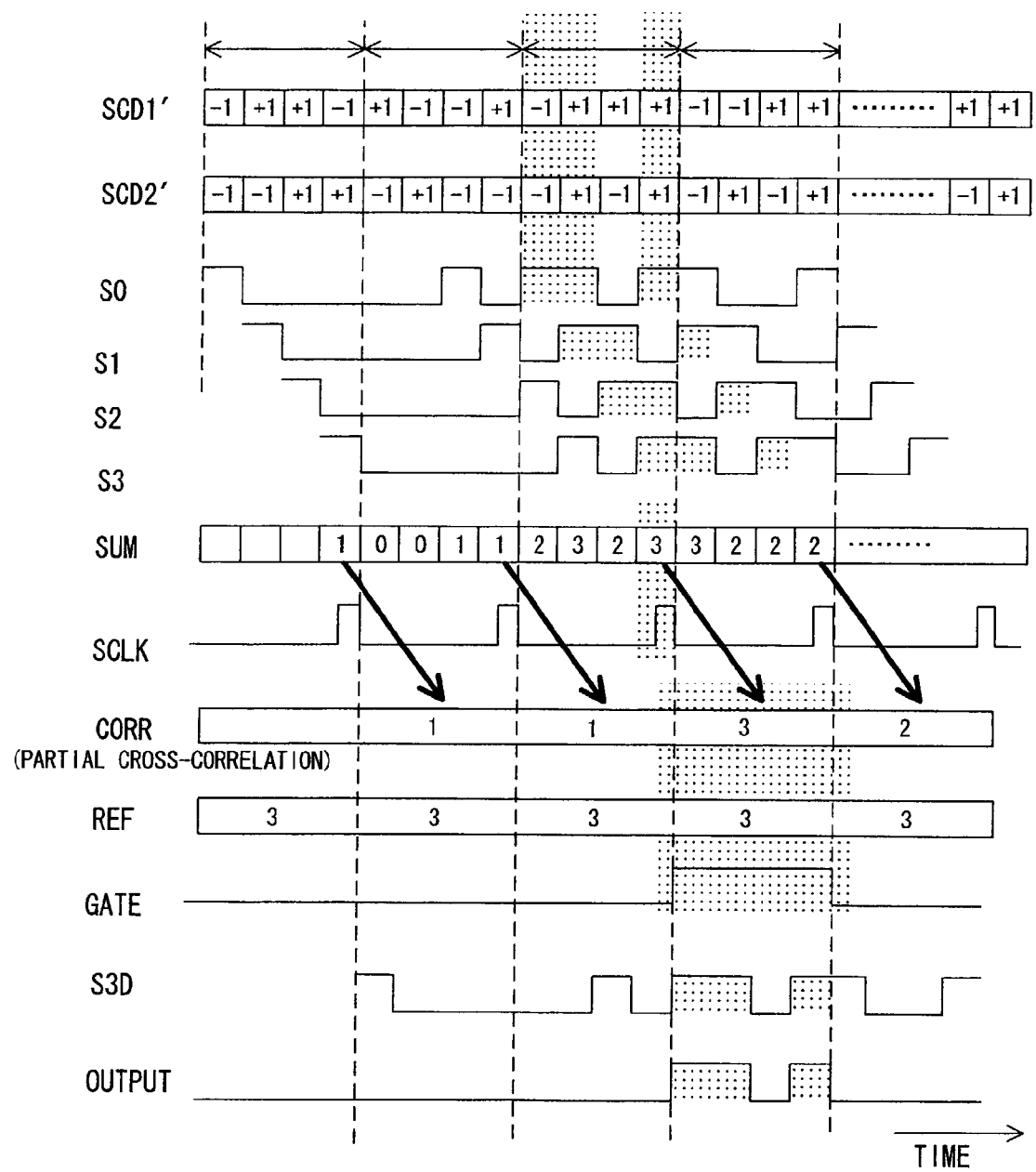
FIG. 9 is a diagram useful in describing operation of the cross-correlation detection controller and code-coincident-chip detector.

FIG. 8 is a block diagram of the cross-correlation detector CORR and code-coincident-chip detector CDCI, and FIG. 9 is a diagram useful in describing the operation thereof. The structure of the cross-correlation detector CORR of FIG. 8 is identical with that of FIG. 5. In FIG. 8, reference characters SCD1', SCD2' represent despreading-code sequences of two systems between which cross-correlation is found; these are the outputs of the despreading-code sequence generators SCG1', SCG2' of FIG. 7. Further, CSTP represents a control signal for controlling stoppage/passage of the despread signal Cdata1' for every chip that enters the switch SW in FIG. 7.

The input despreading-code sequences SCD1', SCD2' of two systems are each delayed a total of four chips by delay units $D_{11}$ to $D_{14}$, $D_{21}$ to $D_{24}$, respectively, which act as one-chip delay elements. The outputs of the delay units $D_{11}$ to $D_{14}$ of one system are input to exclusive-OR circuits $EXOR_1$ to $EXOR_4$ together with the outputs of the delay units $D_{21}$ to $D_{24}$ of the corresponding system. The exclusive-OR circuits $EXOR_1$ to $EXOR_4$ output signals S0 to S3 depending upon whether the values of the two inputs coincide or not. The signal S3 is a signal indicating coincidence/non-coincidence of a first chip in a symbol interval, the signal S2 is a signal indicating coincidence/non-coincidence of a second chip in the symbol interval, the signal S1 is a signal indicating coincidence/non-coincidence of a third chip in the symbol interval, and the signal S0 is a signal indicating coincidence/non-coincidence of a fourth chip in the symbol interval. The adder ADD refers to the four signals S0 to S3 input thereto, counts up the signals that indicate coincidence and outputs a result SUM, which indicates the count, in the form of a 2-bit signal. The counting result SUM is latched in the latching unit LATCH using the symbol clock SCLK output from the clock generator SCLKGEN every symbol (four chips in this case). The comparator CMP compares the latched count (cross-correlation value on a per-symbol basis) CORV with the threshold value REF and outputs the high-level signal GATE if the cross-correlation value CORV is equal to or greater than the threshold value REF. The code-coincident-chip detector CDCI uses an AND gate AND to calculate the AND between a signal S3D, which is obtained by delaying the signal S3 one chip using the delay element $D_3$, and the signal GATE, and outputs the signal S3D as the control signal CSTP in an interval over which the signal GATE is at the high level. When the cross-correlation value CORV on a per-symbol basis is equal to or greater than the predetermined threshold value REF, the control signal CSTP attains the high level only in a chip for which the values of the mutual code sequences coincide within the duration of this symbol. The switch SW in FIG. 7 executes control for allowing/inhibiting passage, on a chip-by-chip basis, of the despread signal Cdata1' in response to the control signal CSTP.

(C) Third Embodiment

Figure 10:
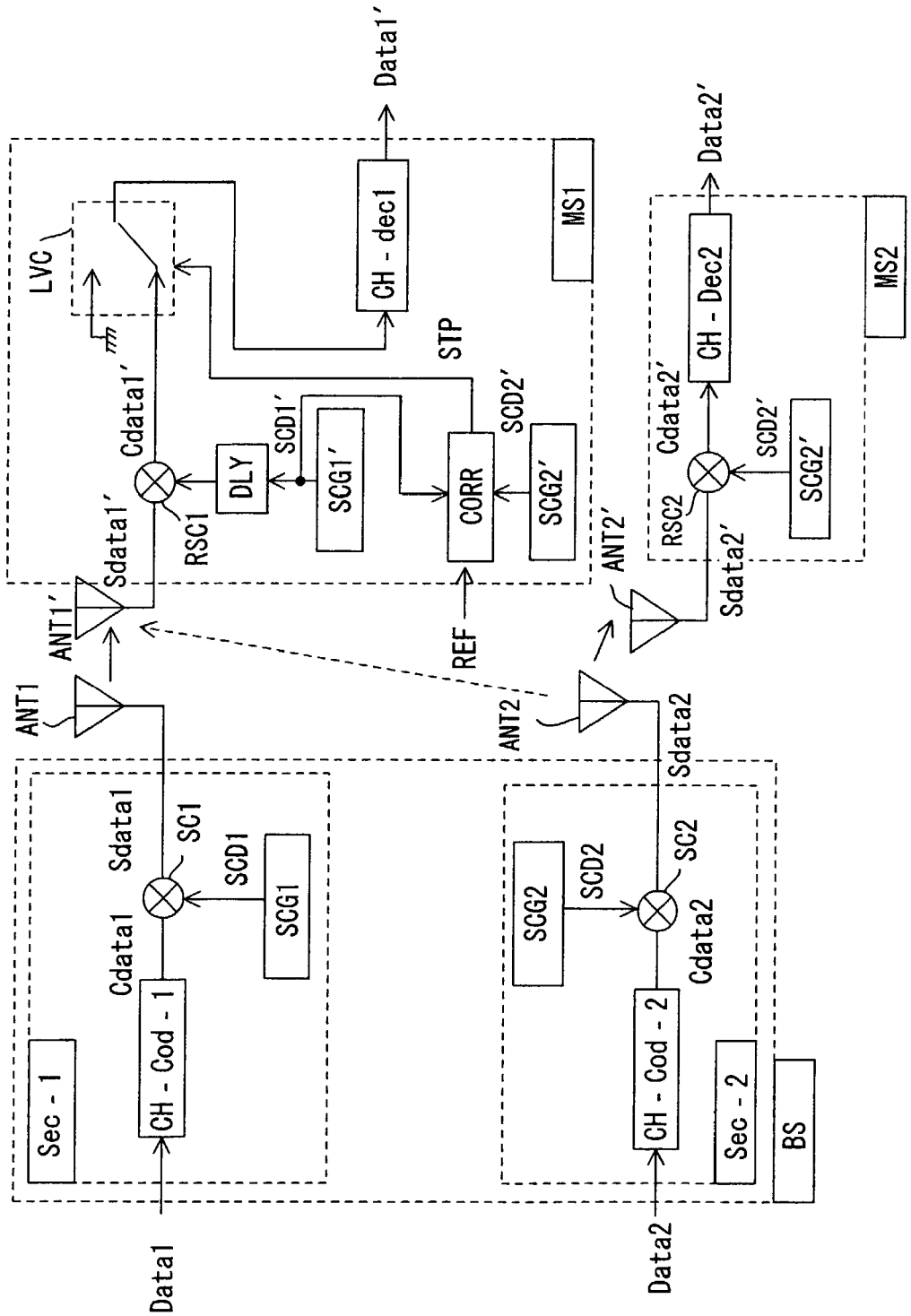
FIG. 10 shows a code division multiple access communication system according to a third embodiment.

FIG. 10 is a block diagram of a code division multiple access communication system according to a third embodiment of the present invention, in which components identical with those of the first embodiment of FIG. 1 are designated by like reference characters. This embodiment differs in that the switch SW of the first embodiment is replaced by a level changer LVC. The level changer LVC inputs the despread signal Cdata1', which is output from the despreading circuit RSC1, to the channel decoder CH-dec1 as is in a favorable communication state (control signal STP=low level) in which the cross-correlation value is small, and (2) changes the level of the despread signal Cdata1', which is output from the despreading circuit RSC1, to a predetermined small value (e.g., ground level) and inputs this to the channel decoder CH-dec1 in a communication state (control signal STP=high level) in which the cross-correlation value increases and interference noise is large.

Channel coders CH-cod1, CH-cod2 in the sectors Sec1, Sec2 of the base station (transmitting apparatus) BS subject the two-transmit signals Data1, Data2, respectively, to error-correction encoding and output encoded transmit signals Cdata1, Cdata2. Spreading circuits SC1, SC2 spread-spectrum modulate the transmit signals Cdata1, Cdata2 using spreading-code sequences SCD1, SCD2 and output spread transmit signals Sdata1, Sdata2. The spread-spectrum modulated transmit signals Sdata1, Sdata2 are input to transmit antennas ANT1, ANT2, respectively, via frequency converters and power amplifiers, etc., which are not shown, and the signals emanate into space from the antennas ANTI, ANT2.

On the receiving side, despreading-code sequence generators SCG1', SCG2' of the mobile stations MS1, MS2 generate despreading-code sequences SCD1', SCD2' identical with the spreading-code sequences SCD1, SCD2 used in spread-spectrum modulation on the transmitting side. The cross-correlation detector CORR in the mobile station MS1 monitors the first and second despreading-code sequences SCD1', SCD2', calculates a cross-correlation value per symbol of the two despreading-code sequences SCD1', SCD2' successively in real time, checks to determine whether the cross-correlation value has exceeded a predetermined threshold value, and outputs the control signal STP, which is for making the level of the signal Cdata' equal to a predetermined small value for the duration of one symbol when the threshold value is exceeded and, hence, interference noise is large.

The delay unit DLY delays the despreading-code sequence SCD1' for a predetermined period of time in such a manner that the despread signal Cdata1' will enter the level changer LVC following the completion of calculation of the cross-correlation value. The despreading circuit RSC1 despreads the receive signal Sdata1' using the delayed despreading-code sequence SCD1' and inputs the despread signal Cdata1' to the level changer LVC. If the control signal STP is at the low level, the level changer LVC outputs the despread signal Cdata1', which enters from the despreading circuit RSC1, as is. If the control signal STP attains the high level, the level changer LVC changes the level of the despread signal Cdata1' to ground level for the duration of the corresponding one symbol. The despread signal Cdata1' that has undergone the level-change processing is subsequently input to the channel decoder CH-dec1. Further, the despreading circuit RSC2 of the mobile station MS2 despreads the receive data Sdata2' using the despreading-code sequence SCD2' and inputs the despread signal Cdata2' to channel decoder CH-dec2 without application of level-change processing.

The channel decoders Ch-dec1, CH-dec2 of mobile stations MS1, MS2 subject the despread signals Cdata1', Cdata2' to error-correction decoding processing, generate final receive data Data1', Data2' and output this data. At this time the symbol for which the change to ground level was made by the level changer LVC is reproduced by the channel decoder CD-dec1.

In accordance with the third embodiment, if a cross-correlation value between spreading-code sequences increases and gives rise to an increase in interference noise, receive processing is executed upon excluding the symbol in the interval of increased noise as a non-receive symbol. As a result, an improvement in the quality of the receive signal becomes possible. In other words, "0", "1" logic of the despread signal Cdata1' is input to the channel decoder CH-dec1 accurately at levels +1, −1. However, if the symbol-by-symbol cross-correlation value rises and interference noise increases, the level changer LVC inputs level 0 (=ground level) to the channel decoder CH-dec1 in this symbol portion. As a result, the channel decoder can execute error-correction processing upon judging that the reliability of the symbol of level 0 is low. This makes it possible to improve reception quality.

(D) Fourth Embodiment

Figure 11:
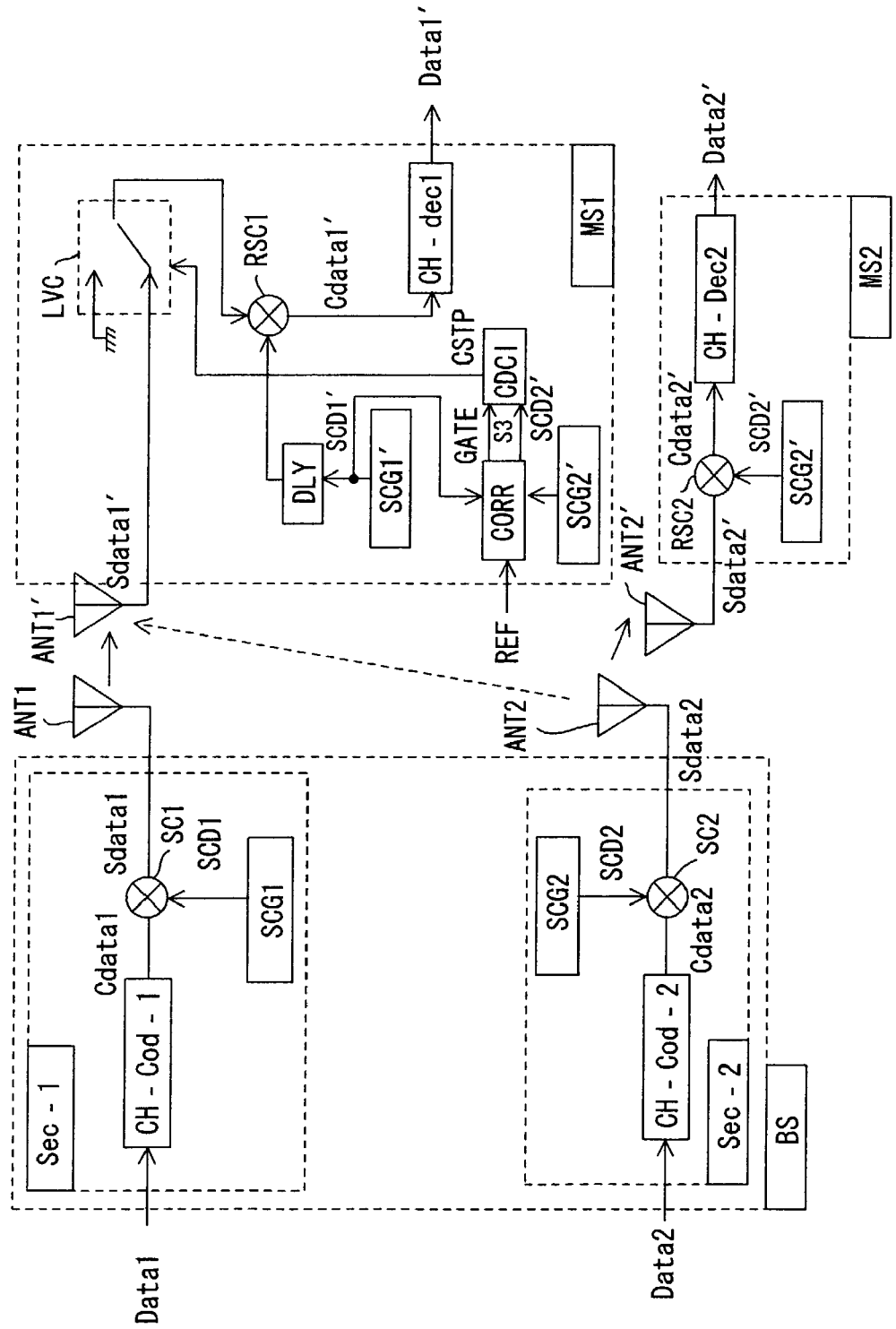
FIG. 11 shows a code division multiple access communication system according to a fourth embodiment.

FIG. 11 is a block diagram of a code division multiple access communication system according to a fourth embodiment of the present invention, in which components identical with those of the third embodiment of FIG. 10 are designated by like reference characters. This embodiment differs in the following respects:

(1) There is provided the code-coincident-chip-detector CDCI which, when the symbol-by-symbol cross-correlation value between the two despreading-code sequences SCD1', SCD2' is equal to or greater than the threshold value REF, detects chips whose codes coincide in a symbol interval and outputs a control signal CSTP that assumes a high level over the duration of each chip in which coincidence is obtained.

(2) The level changer LVC is moved to the input side of the despreading circuit RSC1.

(3) When the cross-correlation value on a per-symbol basis is equal to or greater than the threshold value REF, the level is not changed over the entirety of the symbol interval; instead, the level of the receive signal Sdata1' is changed to the ground level and is output in the code-coincident chip interval (the interval over which the control signal CSTP is at the high level) within the symbol interval.

The structure shown in FIG. 8 can be utilized as is for the cross-correlation detector CORR and code-coincident-chip detector CDCI. Further, the relationship between the third and fourth embodiments is the same as that between the first and second embodiments and the operation thereof need not be described.

(E) Fifth Embodiment

Figure 12:
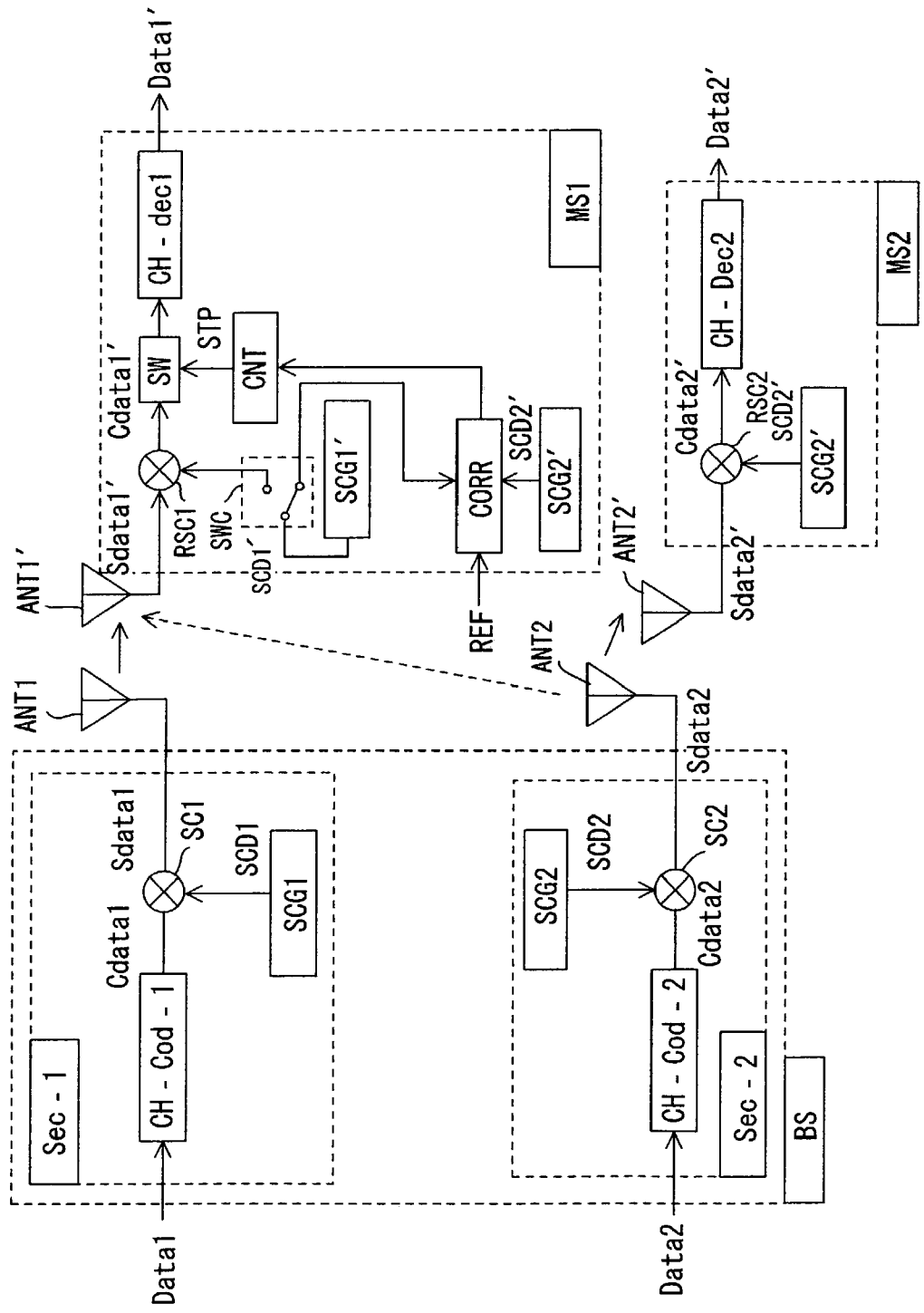
FIG. 12 shows a code division multiple access communication system according to a fifth embodiment of the present invention.

FIG. 12 is a block diagram of a code division multiple access communication system according to a fifth embodiment of the present invention, in which components identical with those of the first embodiment of FIG. 1 are designated by like reference characters. This embodiment differs in the following respects:

(1) The calculation of cross-correlation between the two despreading-code sequences SCD1', SCD2' is executed off-line beforehand and not in real time as in the first embodiment.

(2) The delay unit DLY is deleted.

Before communication starts, a switch SWC in the mobile station MS1 inputs the despreading-code sequence SCD1', which is output from the despreading-code sequence generator SCG1', to the cross-correlation detector CORR. The latter calculates the symbol-by-symbol cross-correlation value between the despreading-code sequence SCD1' and the despreading-code sequence SCD2' output from the despreading-code sequence generator SCG2', checks to determine whether the cross-correlation value has exceeded the predetermined threshold value REF, and outputs the position of the particular symbol to a controller CNT if the threshold value is exceeded. The cross-correlation detector CORR executes the above-described processing until the initial despreading-code sequences SCD1', SCD2' appear again (after one period), and the controller CNT saves all symbol positions for which the cross-correlation value exceeds the predetermined threshold value REF. If the above preprocessing is completed, the switch SWC changes over the output destination of the despreading-code sequence SCD1' to the despreading circuit RSC1.

Under these conditions, the channel coders CH-cod1, CH-cod2 in the sectors Sec1, Sec2 of the base station (transmitting apparatus) BS subject the two transmit signals Data1, Data2, respectively, to error-correction encoding and output the encoded transmit signals Cdata1, Cdata2. The spreading circuits SC1, SC2 spread-spectrum modulate the transmit signals Cdata1, Cdata2 using the spreading-code sequences SCD1, SCD2. The spread-spectrum modulated transmit signals Sdata1, Sdata2 are input to the transmit antennas ANT1, ANT2, respectively, via frequency converters and power amplifiers, etc., which are not shown, and the signals emanate into space from the antennas ANT1, ANT2.

On the receiving side, the despreading-code sequence generators SCG1', SCG2' of the mobile stations MS1, MS2 generate despreading-code sequences SCD1', SCD2' identical with the spreading-code sequences SCD1, SCD2 used in spread-spectrum modulation on the transmitting side. The despreading circuit RSC1 of the mobile station MS1 despreads the receive signal Sdata1' using the despreading-code sequence SCD1' and inputs the despread signal Cdata1' to the switch SW. Further, on the basis of the saved information, the controller CNT outputs the control signal STP that attains the high level at symbol positions where the cross-correlation value exceeds the predetermined threshold value REF.

If the control signal STP attains the high level, the switch SW inhibits passage of the despread signal Cdata1', which enters from the despreading circuit RSC1, for the corresponding one symbol duration. Thereafter, the despread signal Cdata1' thus subjected to switching control is input to the channel decoder CH-dec1. Further, the despreader RSC2 of mobile station MS2 despreads the receive data Sdata2' using the despreading-code sequence SCD2' and inputs the despread signal Cdata2' to the channel decoder CH-dec2 without application of switching control.

The channel decoders CH-dec1, CH-dec2 of mobile stations MS1, MS2 subject the despread signals Cdata1', Cdata2' to error-correction decoding processing, generate the final receive data Data1', Data2' and output this data. At this time the symbol for which passage was partially blocked by the switch SW is reproduced by the channel decoder CD-dec1.

Figure 13:
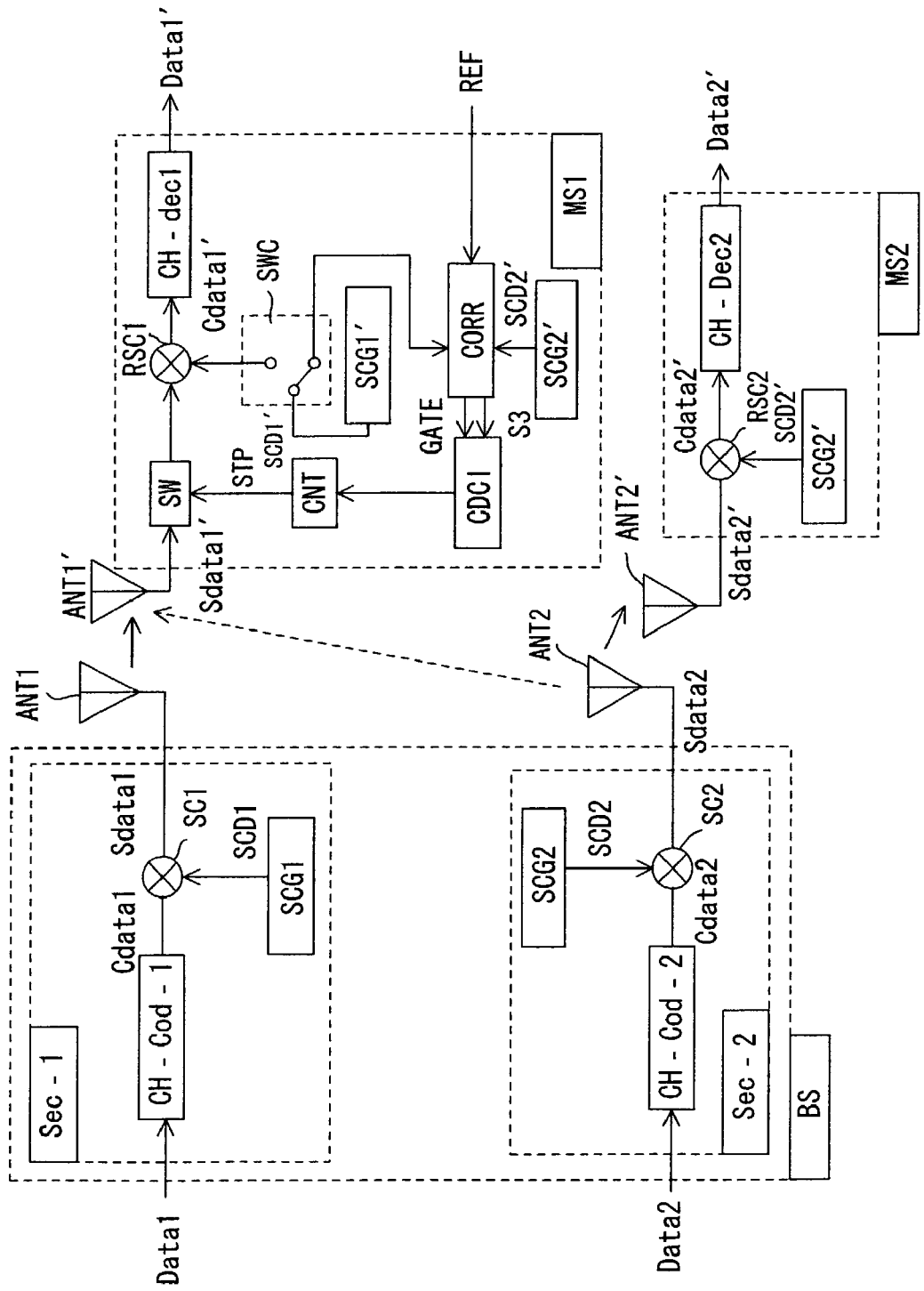
FIG. 13 shows a modification of the fifth embodiment of the present invention.

The fifth embodiment is a case where passage of the despread signal is blocked symbol by symbol. However, it can be so arranged that passage of the despread signal is blocked chip by chip only for the same code in a symbol for which the cross-correlation value exceeds the threshold value. In such case, the code-coincident-chip detector CDCI is provided on the output side of the cross-correlation detector CORR and the switch SW is moved to the input side of the despreading circuit RSC1, as shown in FIG. 13. When the symbol-by-symbol cross-correlation value between the two despreading-code sequences SCD1', SCD2' is equal to or greater than the threshold value REF, a chip position at which the codes of the two code sequences coincide is detected and input to the controller CNT. At the time of communication, the controller CNT outputs the high-level control signal CSTP at the saved chip position.

In accordance with the fifth embodiment, receive processing is executed upon excluding, as a non-receive symbol, a symbol over an interval in which the cross-correlation value between spreading-code sequences increases and gives rise to an increase in interference noise. As a result, an improvement in the quality of the receive signal becomes possible. Further, in accordance with the fifth embodiment, a timing adjustment by a delay unit is not required because it is not necessary to perform calculation of the cross-correlation between the despreading-code sequences SCD1', SCD2' in real time.

(F) Sixth Embodiment

Figure 14:
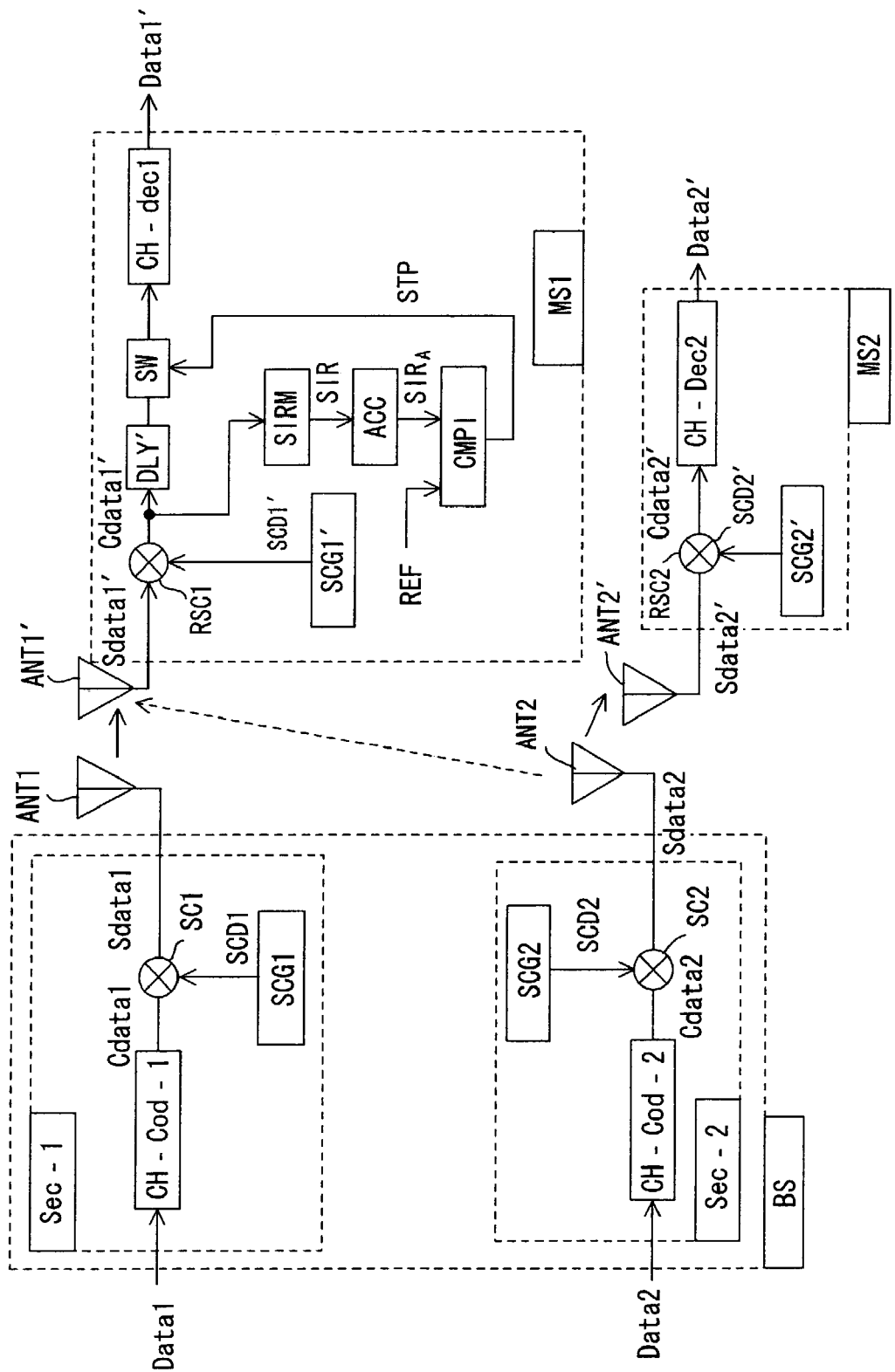
FIG. 14 shows a code division multiple access communication system according to a sixth embodiment of the present invention.

FIG. 14 is a block diagram of a code division multiple access communication system according to a sixth embodiment of the present invention, in which components identical with those of the modification of the first embodiment of FIG. 2 are designated by like reference characters. The sixth embodiment differs in that passage of the despread signal is controlled in the switch SW based upon signal-to-noise ratio (SIR), whereas the first embodiment controls passage of the despread signal in the switch SW based upon the cross-correlation value between the two code sequences.

The channel coders CH-cod1, CH-cod2 in the sectors Sec1, Sec2 of the base station (transmitting apparatus) BS subject the two transmit signals Data1, Data2, respectively, to error-correction encoding and output encoded transmit signals Cdata1, Cdata2. The spreading circuits SC1, SC2 spread-spectrum modulate the transmit signals Cdata1, Cdata2 using spreading-code sequences SCD1, SCD2 and output the spread transmit signals Sdata1, Sdata2. The spread-spectrum modulated transmit signals Sdata1, Sdata2 are input to the transmit antennas ANT1, ANT2, respectively, via frequency converters and power amplifiers, etc., which are not shown, and the signals emanate into space from the antennas ANT1, ANT2.

On the receiving side, the despreading-code sequence generators SCG1', SCG2' of the mobile stations MS1, MS2 generate the despreading-code sequences SCD1, SCD2 identical with the spreading-code sequences SCD1, SCD2 used in spread-spectrum modulation on the transmitting side. The despreading circuits RSC1, RSC2 despread the receive signals Sdata1', Sdata2' using the delayed despreading-code sequences SCD1', SCD2' and output despread signals Cdata1, Cdata2'.

A signal-to-noise ratio measurement unit (SIRM) in the mobile station MS1 measures the signal-to-noise ratio SIR based upon the despread signal Cdata1', an averaging unit ACC calculates the moving average of the signal-to-noise ratio SIR over a predetermined interval, and a comparator CMP1 compares the average value $SIR_A$ and the threshold value REF. If the averaged signal-to-noise ratio $SIR_A$ is less than the threshold value REF, the comparator CMP1 sends a switch SW1 the control signal STP for blocking passage of the despread signal Cdata1' conforming to a symbol over an interval that prevails until the next moving average is found.

A delay unit DLY' delays the despread signal Cdata1' for a predetermined period of time in such a manner that this despread signal will enter the switch SW following completion of processing for comparing the signal-to-noise ratio $SIR_A$ and the threshold value REF. If the control signal STP attains the high level, the switch SW inhibits passage of the despread signal Cdata1', which enters from the despreading circuit RSC1, for the corresponding one symbol duration. Thereafter, the despread signal Cdata1' thus subjected to switching control is input to the channel decoder CH-dec1. Further, the despreader RSC2 of mobile station MS2 despreads the receive data Sdata2' using the despreading-code sequence SCD2' and inputs the despread signal Cdata2' to the channel decoder CH-dec2 without application of switching control.

The channel decoders Ch-dec1, CH-dec2 of mobile stations MS1, MS2 subject the despread signals Cdata1', Cdata2' to error-correction decoding processing, generate the final receive data Data1', Data2' and output this data. At this time the symbol for which passage was partially blocked by the switch SW is reproduced by the channel decoder CD-dec1.

It should be noted that the level changer LVC can be used in place of the switch SW in the sixth embodiment.

In accordance with the sixth embodiment, receive processing is executed upon excluding a symbol as a non-receive symbol when the signal-to-noise ratio SIR takes on a large value. As a result, an improvement in the quality of the receive signal becomes possible. That is, if the SIR on a per-symbol basis worsens and interference noise increases, the fact that the quality of the symbol has declined is reported to the channel decoder in the form of signal level=0 (soft-decision likelihood information). Based upon this information, the channel decoder can judge that the reliability of the symbol is low and execute error-correction processing, as a result of which reception quality can be improved.

Signal-to-noise Measurement Unit

Figure 15:
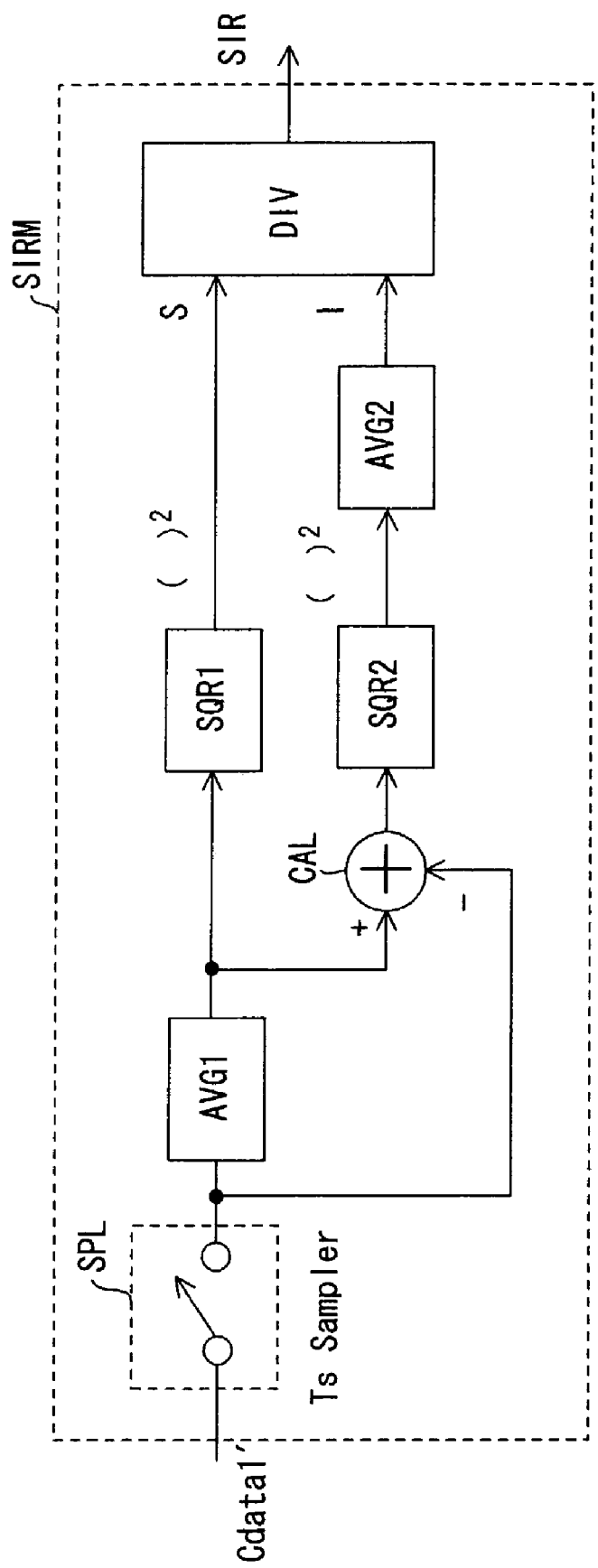
FIG. 15 is a block diagram of a SIR measurement circuit.

FIG. 15 is a block diagram of the SIR measurement circuit SIRM. Here a sampler SPL samples the voltage value of the despread signal Cdata1' at a symbol discrimination timing (symbol period Ts) and outputs a sample-data sequence every symbol period Ts. A first averaging unit AVR1, to which the data sequence is applied, calculates the moving average over a predetermined interval (e.g., 1 ms) and outputs the moving-average value at the symbol period. A squaring unit SQR1 squares the moving-average value to obtain receive signal power S. Meanwhile, a calculation unit CAL calculates the difference between the sampled data sequence and the moving-average value, a squaring unit SQR2 squares the difference and a second averaging unit AVR2 calculates the moving average over a fixed interval (e.g., 1 ms) and obtains interference power I as the variance of the sample data. A divider DIV divides the receive signal power S by the interference power I, thereby outputting the signal-to-noise ratio SIR.

In the above embodiments, the despreading-code sequences are assumed to be code sequences that repeat cyclically at a predetermined period. The despreading-code sequence can be created as follows: By way of example, a despreading-code sequence having a code length of $2^n-1$ is generated using an n-bit shift register, a code-sequence segment having a length corresponding to 10 ms is cut from this despreading-code sequence, and the partial code sequence thus cut is generated repeatedly every 10 ms, thereby creating a despreading-code sequence. Spreading-code sequences can also be generated in similar fashion.

Further, in the foregoing embodiments, passage of part of a receive signal is stopped based upon a cross-correlation value between spreading-code sequences. However, control for stopping passage of part of a receive signal can be carried out based upon a cross-correlation value between spread signals that prevail after a transmit symbol has been spread by a spreading-code sequence.

In accordance with the code division multiple access signal receiving apparatus of the present invention, receive processing can be executed upon first excluding a specific symbol portion over which interference noise increases owing to local worsening of cross-correlation. As a result, an improvement in the quality of the receive signal becomes possible.

What is claimed is:

1. A code division multiple access signal receiving apparatus for demodulating transmit data by subjecting a receive signal to despread processing using a code sequence identical with a spreading-code sequence on a transmitting side, comprising:
   a cross-correlation detector for calculating a cross-correlation value per symbol between a spreading-code sequence for spread-spectrum modulating local-station-addressed transmit data and a spreading-code sequence for spread-spectrum modulating other-station-addressed transmit data;
   a comparator for comparing the cross-correlation value with a threshold value;
   a control signal output portion for outputting a control signal during a symbol interval when the cross-correlation value is larger than or equal to the threshold value; and
   a switch for halting passage of a portion of the receive signal that corresponds to said symbol interval during which the control signal is output or halting despread processing of a portion of the receive signal that corresponds to said symbol interval.

2. A code division multiple access signal receiving apparatus according to claim 1, comprising:
   a despreader for subjecting the receive signal to despread processing using a code sequence identical with a spreading-code sequence on the transmitting side; and
   a decoder for decoding transmit data using a despread signal output from the despreader;
   said switch regarding the receive signal prior to despreading thereof or a despread signal as said receive signal, and halting passage of a portion of the despread signal that corresponds to all or a part of said spreading-code sequence.

3. A code division multiple access signal receiving apparatus according to claim 2, comprising:
   a delay unit for delaying said code sequence for despread processing or despread signal for a prescribed period of time;
   said delay unit matching timing of the despread signal, which is input to said switch, to detection timing of the cross-correlation value by delay processing.

4. A code division multiple access signal receiving apparatus according to claim 1, wherein said cross-correlation detector calculates the cross-correlation value between said spreading-code sequences in advance and saves the position of the spreading-code sequence discriminated to be an interference interval based upon the cross-correlation value; and
   said switch halts passage of a portion of the receive signal regarding all or part of a spreading-code sequence that conforms to the position saved.

5. A code division multiple access signal receiving apparatus according to claim 1, wherein said switch outputs a signal of a predetermined level when blocking passage of part of the receive signal.

6. A code division multiple access signal receiving apparatus for demodulating transmit data by subjecting a receive signal to despread processing using a code sequence identical with a spreading-code sequence on a transmitting side, comprising:
   a cross-correlation detector for calculating a cross-correlation value per symbol between spread-spectrum modulated local-station-addressed transmit data and spread-spectrum modulated other-station-addressed transmit data;

a comparator for comparing the cross-correlation value with a threshold value;

a control signal output portion for outputting a control signal during a symbol interval when the cross-correlation value is larger than or equal to the threshold value; and a switch for halting passage of a portion of the receive signal that corresponds to said symbol interval dining which the control signal is output or halting despread processing of a portion of the receive signal that corresponds to said symbol interval.

7. A code division multiple access signal receiving apparatus for demodulating transmit data by subjecting a receive signal to despread processing using a code sequence identical with a spreading-code sequence on a transmitting side, comprising:

a cross-correlation detector for calculating a cross-correlation value per symbol between a first spreading-code sequence for spread-spectrum modulating local-station-addressed transmit data and a second spreading-code sequence for spread-spectrum modulating other-station-addressed transmit data;

a comparator for comparing the cross-correlation value with a threshold value;

a code-coincident-chip detector for detecting whether the values of the first and second spreading-code sequence coincide or not per chip;

a control signal output portion for outputting a control signal during a chip interval when the values of the first and second spreading-code sequence coincide per chip and the cross-correlation value is larger than or equal to the threshold value; and a switch for halting passage of a portion of the receive signal that corresponds to said chip interval during which the control signal is output or halting despread processing of a portion of the receive signal that corresponds to said chip interval.

8. A code division multiple access signal receiving apparatus according to claim 7 comprising:

a despreader for subjecting a receive signal to despread processing using a code sequence identical with the spreading-code sequence on the transmitting side; and a decoder for decoding transmit data using a despread signal output from the despreader;

said switch regarding the receive signal prior to despreading thereof or the despread signal as said receive signal, and halting passage of a portion of the despread signal that corresponds to all or a part of said spreading-code sequence on the transmitting side.

9. A code division multiple access signal receiving apparatus according to claim 8 comprising:

a delay unit for delaying said code sequence for despread processing or despread signal for a prescribed period of time;

said delay unit matching timing of the despread signal, which is input to said switch, to detection timing of the cross-correlation value by delay processing.

10. A code division multiple access signal receiving apparatus according to claim 7 wherein said cross-correlation detector calculates the cross-correlation value between said spreading-code sequence in advance and saves the position of the spreading-code sequence discriminated to be an interference interval based upon the cross-correlation value; and said switch halts passage of a portion of the receive signal regarding all or part of the spreading-code sequence that conforms to the position saved.

11. A code division multiple access signal receiving apparatus according to claim 7 wherein said switch outputs a signal of a predetermined level when blocking passage of part of the receive signal.

12. A code division multiple access signal receiving apparatus comprising:

a decoder for decoding transmit data;

a despreader for subjecting a receive signal to despread processing; and a cross-correlation detector for calculating a cross-correlation value between a first spreading-code sequence for spread-spectrum modulating local-station-addressed transmit data and a second spreading-code sequence that differs from said first spreading-code sequence and for generating, based upon the result of the cross-correlation value, a control signal that prevents a portion of the result of the despread processing from inputting to said decoder.

* * * * *